(12) United States Patent
Alhooshani et al.

(10) Patent No.: US 12,497,309 B1
(45) Date of Patent: Dec. 16, 2025

(54) FLUID CATALYTIC CRACKING CATALYST FOR ORGANIC POLLUTANT WASTEWATER TREATMENT

(71) Applicant: King Fahd University of Petroleum and Minerals, Dhahran (SA)

(72) Inventors: Khalid Alhooshani, Dhahran (SA); Shaimá Ibrahim Alsabbahen, Dhahran (SA); Abdulkadir Tanimu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/240,244

(22) Filed: Jun. 17, 2025

Related U.S. Application Data

(60) Provisional application No. 63/727,822, filed on Dec. 4, 2024.

(51) Int. Cl.
*C02F 1/72* (2023.01)
*B01J 29/06* (2006.01)
*C02F 101/30* (2006.01)

(52) U.S. Cl.
CPC ............ *C02F 1/725* (2013.01); *B01J 29/06* (2013.01); *C02F 2101/30* (2013.01)

(58) Field of Classification Search
None
See application file for complete search history.

(56) References Cited

U.S. PATENT DOCUMENTS

| 4,083,807 | A * | 4/1978 | Mckinney | B01J 29/00 502/64 |
| 10,414,991 | B2 * | 9/2019 | Umansky | B01J 27/19 |
| 10,807,047 | B2 * | 10/2020 | Chu | B01J 20/3483 |
| 12,226,741 | B2 * | 2/2025 | Liu | C01B 39/46 |
| 2007/0202318 | A1 * | 8/2007 | Smith | C09K 8/805 428/323 |

(Continued)

FOREIGN PATENT DOCUMENTS

| CN | 111689544 A | 9/2020 | |
| CN | 111763069 A * | 10/2020 | C04B 33/32 |
| CN | 111017951 B | 7/2021 | |

OTHER PUBLICATIONS

Fluid Catalytic Cracking—Wikipedia, 11 pages; downloaded Sep. 9, 2025 (Year: 2025).*

(Continued)

*Primary Examiner* — Robert J Popovics
(74) *Attorney, Agent, or Firm* — Oblon, McClelland, Maier & Neustadt, L.L.P.

(57) ABSTRACT

A method of removing an organic pollutant from water that includes contacting contaminated water with a filtration membrane including sorbent particles of a spent fluid catalytic cracking catalyst (FCC) that includes a porous aluminosilicate material, and a carbonaceous material disposed on a surface of the porous aluminosilicate material, and a polymer support, to form a contaminated membrane, and collecting a purified water. The sorbent particles include 8.0-50.0 atom % carbon, based on a total number of atoms of sorbent particles, and the organic pollutant is at least one selected from the group including a dye, a phenol, a polycyclic aromatic hydrocarbon, an herbicide, a pesticide, and a persistent organic pollutant.

17 Claims, 11 Drawing Sheets

(56) References Cited

U.S. PATENT DOCUMENTS

| | | |
|---|---|---|
| 2010/0266468 A1 | 10/2010 | Yang et al. |
| 2017/0189894 A1* | 7/2017 | Iwasa ................... B01J 38/14 |
| 2018/0002617 A1* | 1/2018 | Umansky ............. B01J 35/618 |
| 2019/0359899 A1* | 11/2019 | Umansky ............. B01J 35/633 |
| 2022/0118420 A1 | 4/2022 | Alhooshani et al. |
| 2022/0241732 A1* | 8/2022 | Liu ..................... B01D 71/028 |
| 2024/0010583 A1* | 1/2024 | Schmidt ................. C07C 4/06 |
| 2025/0281896 A1* | 9/2025 | Alhooshani ........ B01J 20/28064 |

OTHER PUBLICATIONS

T. Gameiro, et al., "Reusing spent fluid catalytic cracking catalyst as an adsorbent in wastewater treatment applications", Materials Today Sustainability, vol. 24, Sep. 20, 2023, 100555, 15 pages.

X. Zhang, et al., "Identification of the organic adsorptive species on fluid-bed catalytic cracking coking catalysts", Chinese Journal of Analytical Chemistry, vol. 34, Sep. 2006, pp. S199-S202, Abstract only, 1 page.

* cited by examiner

FLUID CATALYTIC CRACKING CATALYST FOR ORGANIC POLLUTANT WASTEWATER TREATMENT

CROSS-REFERENCE TO RELATED APPLICATIONS

The present application claims priority to U.S. Provisional Application No. 63/727,822, filed Dec. 4, 2024, which is incorporated by reference in its entirety for all purposes.

STATEMENT OF PRIOR DISCLOSURE BY AN INVENTOR

Aspects of the present disclosure are described in S. I. Alsabbahen, et. al., "Spent FCC catalyst as sorbent for pesticides microextraction: a sustainable approach towards waste recycling and reuse", Int. J. Environ. Sci. Technol., 2025: 1-14, and S. I. Alsabbahen, et. al., "Spent FCC catalyst in pesticides microextraction a sustainable approach towards waste recycling/reuse", PROCEEDINGS 32nd Saudi Japan Annual Symposium, Dec. 5-6, 2023, each of which is incorporated herein by reference in its entirety.

BACKGROUND

Technical Field

The present disclosure is directed towards a spent fluid catalytic cracking catalyst (FCC) catalyst for removing pollutants from water.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Water pollution due to pesticide residues is a prevalent issue worldwide, with detrimental consequences for human health. Access to clean drinking water is a fundamental human right essential for maintaining a healthy life. However, numerous water sources have been found to be contaminated with pesticide residues, posing a significant threat to public health. The presence of pesticides in natural water sources, originating from field applications and post-application runoff, is a serious concern. Ensuring the availability of clean and safe drinking water is crucial for public health, as its absence may impose a significant health burden on the global population.

Pesticides may infiltrate aquatic systems through various hydrological pathways, whether surface or subsurface. The primary contributors to the transfer of pesticides to surface water include spray drift, runoff water, and drainage water. Unfortunately, such contamination has detrimental consequences for human health, leading to carcinogenic, endocrine, neurological, reproductive, and other health issues. Tragically, fatalities have been documented due to pesticide exposure, with studies revealing a 25%-30% increased risk of cancer and mental health disorders associated with such exposure. Moreover, paternal pesticide exposure is linked to a 50% increased incidence of leukemia, lymphoma, and brain cancer in children.

Membrane-supported micro-solid-phase extraction (MSPE) is a widely applicable sample preparation method, known for its effectiveness and convenience in analyzing various substances across multiple research fields. Its versatility is highlighted by numerous studies detailing various MSPE methodologies, demonstrating its success in examining a broad spectrum of compounds. With applications ranging from flavors and fragrances to environmental research and bioanalytical studies, MSPE extraction has established itself as a valuable analytical tool across various domains. Recent reviews compile its paramount utility in distinct areas, including the examination of volatile compounds in wine, in vivo monitoring of soil contaminants, and analysis of water samples and food, as well as in vitro and in vivo metabolomics investigations.

However, the MSPE process may have some disadvantages, including limited sensitivity for trace analytes, potential interference from complex sample matrices, and the need for precise optimization of sorbent materials. Additionally, the process may require multiple steps, making it time-consuming and labor-intensive for large-scale applications. The sorbent used in MSPE may suffer from sorbent saturation over time such as when sorbents lose their ability to extract pesticide residues from water after multiple extractions, reduced efficiency with high matrix complexity, and challenges in achieving optimal selectivity. Additionally, improper sorbent choice may lead to low extraction efficiency. Hence, choosing the right sorbent is a crucial factor in MSPE extraction processes, where the effectiveness heavily relies on the ability of the sorbent to selectively extract and concentrate target analytes from complex sample matrix. Some sorbents also have limited binding capacities, struggling to efficiently extract trace contaminants, like low-concentration heavy metals from water. Advanced sorbents, such as carbon nanotubes, offer high efficiency but are costly, limiting their large-scale application.

Each of the aforementioned sorbent material suffers from one or more drawbacks hindering their adoption. Accordingly, one object of the present disclosure to provide a sorbent material for organic pollutant removal from water, that may circumvent the drawbacks, such as, low extraction efficiency, low efficiency, high sorbent saturation overtime, high-cost factor, of the materials known in the art.

SUMMARY

According to first aspect, the present disclosure relates to a method of removing an organic pollutant from water. In some embodiments, the method includes contacting a contaminated water with a filtration membrane including sorbent particles of a spent fluid catalytic cracking catalyst (FCC) that includes a porous aluminosilicate material, and a carbonaceous material disposed on a surface of the porous aluminosilicate material, and a polymer support, to form a contaminated membrane. In some embodiments, the method includes collecting a purified water. In some embodiments, the sorbent particles include 8.0 atom % to 50.0 atom % carbon, based on a total number of atoms of sorbent particles. In some embodiments, the organic pollutant is at least one selected from the group consisting of a dye, a phenol, a polycyclic aromatic hydrocarbon, an herbicide, a pesticide, and a persistent organic pollutant.

In some embodiments, the porous aluminosilicate material is a USY zeolite.

In some embodiments, the sorbent particles include 18.0 atom % to 30.0 atom % carbon, based on a total number of atoms of sorbent particles.

In some embodiments, the sorbent particles have a silicon to aluminum atomic ratio of 2.70 to 4.50.

In some embodiments, the sorbent particles have a Brunauer-Emmett-Teller (BET) surface area of 115 square meter per gram ($m^2/g$) to 150 $m^2/g$, a pore volume of 0.1500 cubic centimeter per gram ($cm^3/g$) to 0.1850 $cm^3/g$, and a mean pore size of 4.75 nanometer (nm) to 6.00 nm.

In some embodiments, the sorbent particles have a mean particle size of 25 micrometer ($\mu m$) to 400 $\mu m$.

In some embodiments, the polymer support is a polypropylene support.

In some embodiments, the polymer support has a mean pore size of 0.10 $\mu m$ to 0.50 $\mu m$.

In some embodiments, the carbonaceous material is a fluid catalytic cracking coke.

In some embodiments, the sorbent particles further include a silica coating disposed on a surface of the porous aluminosilicate material and a surface of the carbonaceous material.

In some embodiments, the method further includes recovering the organic pollutant by contacting the contaminated membrane with an elution solvent to form a contaminated solvent including the organic pollutant and collecting the contaminated solvent.

In some embodiments, the contaminated solvent includes 80% to greater than 99.99% of an initial amount of organic pollutant present in the contaminated water.

In some embodiments, the elution solvent is at least one selected from the group including 2-propanol, acetone, methylene chloride, chloroform, methanol, and ethyl acetate.

In some embodiments, the organic pollutant is at least one selected from the group including isoprocarb, atrazine, primicarb, penconazole, chlorfenapr, and mefenacet.

In some embodiments, the method further includes forming the filtration membrane by washing a spent fluid catalytic cracking catalyst with an alcohol having 1 carbon atom to 5 carbon atoms to form an untreated aluminosilicate material and disposing the untreated aluminosilicate material on the polymer support.

In some embodiments, the method further includes forming the filtration membrane by washing a spent fluid catalytic cracking catalyst with an alcohol having 1 carbon atom to 5 carbon atoms to form an untreated aluminosilicate material. Further, the method includes calcining the untreated aluminosilicate material at 500° C. to 750° C. for 1 hour to 12 hours to form a treated aluminosilicate material and disposing the treated aluminosilicate material on the polymer support.

In some embodiments, the method further includes forming the filtration membrane by washing a spent fluid catalytic cracking catalyst with an alcohol having 1 carbon atom to 5 carbon atoms to form an untreated aluminosilicate material, Further, the method includes solvothermally treating a coating mixture including the untreated aluminosilicate material and an organosilane at 75° C. to 125° C. for 8 hours to 48 hours to form an intermediate, Still further, the method includes calcining the intermediate at 500° C. to 750° C. for 1 hour to 12 hours to form a coated aluminosilicate material, and disposing the coated aluminosilicate material on the polymer support.

In some embodiments, the organosilane is tetraethoxysilane.

In some embodiments, the coating mixture has a weight ratio of the untreated aluminosilicate material to the organosilane of 2:1 to 1:2.

In some embodiments, the method removes greater than 97.5% of an initial amount of organic pollutant.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
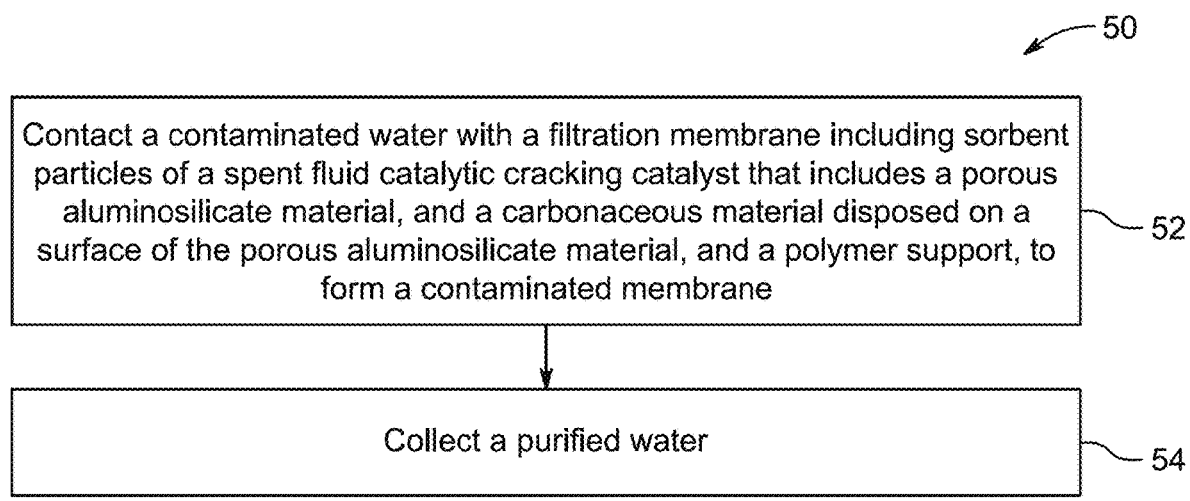
FIG. 1A is a schematic flowchart of method of removing an organic pollutant from water, according to certain embodiments.

In the drawings, like reference numerals designate identical or corresponding parts throughout the several views.

Further, as used herein, the words 'a,' 'an' and the like generally carry a meaning of 'one or more,' unless stated otherwise.

As used herein, the words "about," "approximately," or "substantially similar" may be used when describing magnitude and or position to indicate that the value and/or position described is within a reasonable expected range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The present disclosure is intended to include all hydration states of a given compound or formula, unless otherwise noted or when heating a material.

As used herein, the term 'pollutants' refers to a substance introduced into the environment that have undesired or even detrimental consequences. Pollutants can take various forms, including chemicals, particles, biological materials, or energy, that negatively affect the air, water, soil, or living organisms. These substances may arise from human activities, such as industrial processes, agricultural practices, and waste disposal, or from natural events like wildfires and volcanic eruptions.

As used herein, the term 'organic pollutant' refers to carbon-based chemical compounds that persist in the environment, contaminate air, water, and soil, and pose serious health risks to humans and wildlife. These pollutants originate from industrial, agricultural, and domestic activities, with some being biodegradable while others persist for decades. Among organic pollutants, dyes, phenols, polycyclic aromatic hydrocarbons (PAHs), herbicides, pesticides, and persistent organic pollutants (POPs) are major contaminants, each with distinct sources and harmful effects.

The organic pollutant may be a dye, a phenol, a polycyclic aromatic hydrocarbon, an herbicide, a pesticide, a persistent organic pollutant, or so on.

A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphtacene, pentaphene, picene, and biphenylene.

An herbicide (also known as 'weedkiller') is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, may be transported by wind and water, and may persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

As used herein, the term 'membrane' refers to a porous structure that is capable of separating components of a homogeneous or heterogeneous fluid. In particular, 'pores' in the sense of the present disclosure indicate voids allowing fluid communication between different sides of the structure. More particular in use when a homogeneous or heterogeneous fluid is passed through the membrane, some components of the fluid may pass through the pores of the membrane into a 'permeate stream', some components of the fluid may be retained by the membrane and may thus accumulate in a 'retentate' and/or some components of the fluid may be rejected by the membrane into a 'rejection stream'. Membranes may be of various thicknesses, with homogeneous or heterogeneous structures. Membranes may be in the form of flat sheets or bundles of hollow fibers. Membranes may also be in various configurations, including but not limited to spiral wound, tubular, hollow fiber, and other configurations identifiable to a skilled person upon a reading of the present disclosure. Membranes may also be classified according to their pore diameter. Membranes may be neutral or charged, and particle transport may be active or passive. The latter may be facilitated by pressure, concentration, and chemical or electrical gradients of the membrane process.

As used herein, the term 'catalyst' refers to the substance that speeds up a chemical reaction without being consumed in the process or a person or thing that precipitates an event or change. Catalysts may include but are not limited to, homogeneous catalysts, heterogeneous catalysts, enzymes, acid catalysts, base catalysts, photochemical catalysts, electrocatalysts, and biocatalysts.

As used herein, the term 'zeolite' refers to a material having the crystalline structure or three-dimensional framework of, but not necessarily the elemental composition of, a zeolite. Zeolites are porous silicate or aluminosilicate minerals that can be naturally occurring or synthetic. Elementary building units of zeolites are $SiO_4$ tetrahedra (and, if appropriate, $AlO_4$ tetrahedra and/or $AlO_6$ octahedra). Adjacent tetrahedra are linked at their corners via a common oxygen atom, which results in an inorganic macromolecule with a three-dimensional framework (frequently referred to as the zeolite framework). The three-dimensional framework of a zeolite also includes channels, channel intersections, and/or cages having dimensions in the range of 0.1-10 nanometers (nm). Water molecules may be present inside these channels, channel intersections, and/or cages. Zeolites that are devoid of aluminum may be referred to as 'all-silica zeolites' or 'aluminum-free zeolites.' Some zeolites which are substantially free of, but not devoid of, aluminum is referred to as 'high-silica zeolites'. Sometimes, the term 'zeolite' is used to refer exclusively to aluminosilicate materials, excluding aluminum-free zeolites or all-silica zeolites.

As used herein, the term 'USY (Ultra-Stable Y) zeolite' refers to a type of synthetic zeolite with a high degree of stability and resistance to thermal and hydrothermal degradation. It is generally used as a catalyst in petroleum refining processes, such as fluid catalytic cracking (FCC), due to its high surface area, large pore structure, and catalytic properties. USY zeolite has a modified structure compared to regular Y-zeolite.

As used herein, the term 'fluid catalytic cracking (FCC) catalyst' refers to a substance used in the FCC process, which is a key method in petroleum refining to break down large hydrocarbons into smaller, more valuable products such as gasoline and diesel. These catalysts typically consist of solid materials, often zeolites, that facilitate the chemical reactions needed to crack large molecules into lighter ones.

As used herein, the term 'sorbent particles' refer to solid materials that have the ability to adsorb or absorb other substances, such as gases, liquids, or dissolved compounds, onto their surface or within their structure. These particles are used in various applications, including filtration, purification, and environmental cleanup, where they capture pollutants or contaminants from air, water, or other media. Sorbents can be made from materials like activated carbon, zeolites, or synthetic polymers, depending on the specific use and the type of substance being removed.

As used herein, the term 'porous aluminosilicate material' refers to a type of compound made up of aluminum, silicon, and oxygen, with a highly structured and porous framework. The porous nature of these materials allows them to have a large surface area and the ability to adsorb or catalyze reactions. These materials are generally used in applications such as catalysis (e.g., in zeolites), filtration, and environmental cleanup due to their high stability and ability to trap molecules within their pores.

As used herein, the term 'carbonaceous material' refers to any substance primarily composed of carbon, generally in combination with other elements like hydrogen, oxygen, or nitrogen. These materials include natural substances like coal, charcoal, and graphite, as well as synthetic forms like activated carbon.

As used herein, the term 'elution solvent' refers to a liquid used in the process of elution, which involves washing or removing substances from a material (such as a column in chromatography) to separate or purify specific compounds. The elution solvent helps to dissolve and carry away the target substances, allowing them to be collected separately.

According to a first aspect, the present disclosure relates to a method of removing an organic pollutant from water. In some embodiments, the method comprises contacting a contaminated water with a filtration membrane and collecting a purified water.

In some embodiments, the filtration membrane includes sorbent particles of a spent fluid catalytic cracking (FCC) catalyst, and a polymer support. Sorbent particles of the spent FCC catalyst refer to the used catalyst particles from the FCC process in petroleum refining. These particles have undergone catalytic reactions to break down heavy hydrocarbons into lighter products like gasoline and diesel. Typically, the catalyst deactivates over time due to coke deposition, metal contamination, and structural degradation. In some embodiments, the sorbent particles of the spent FCC catalyst include a porous aluminosilicate material, and a carbonaceous material disposed on a surface of the porous aluminosilicate material.

In some embodiments, the porous aluminosilicate material is a zeolitic material. As used herein, the term "zeolitic material" refers to a material having the crystalline structure or three-dimensional framework of, but not necessarily the elemental composition of, a zeolite.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. Examples of suitable zeolite frameworks include, but are not limited to a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework.

In some embodiments, the porous aluminosilicate material is a USY zeolite. In some embodiments, the alternatives of the USY zeolite may include, but is not limited to, ZSM-5 zeolite, mordenite, faujasite, clinoptilolite, chabazite, beta zeolite, linde type A zeolite, linde type Y zeolite, NaX zeolite, NaY zeolite, zeolite A, offretite, erionite, heulandite, stilbite, analcime, gismondine, wairakite, and laumontite.

In some embodiments, the porous aluminosilicate material may have at least one layer of the carbonaceous material deposited on its surface. Such a carbonaceous material may be deposited in a layer which partially or wholly covers the surface of the porous aluminosilicate material. In some embodiments, the layer is uniform and continuous manner. In some embodiments, the carbonaceous material may include a carbon nanomaterial. Examples of carbon nanomaterials include, but are not limited to, activated carbon, charcoal, biochar, graphite, carbon nanotubes, and graphene oxide. In some embodiments, the carbonaceous material includes amorphous carbon.

In some embodiments, the carbonaceous material is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In some embodiments, the carbon nanotubes are armchair type nanotubes. In other embodiments, the carbon nanotubes are chiral type nanotubes.

In some embodiments, the carbonaceous material is graphene. In some embodiments, the carbonaceous material is graphene nanosheets. Graphene nanosheets may consist of stacks of graphene sheets, the stacks having an average thickness and a diameter. In some embodiments, the stacks include 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In some embodiments, the graphene is functionalized graphene. Functionalized graphene is distinguished from pristine graphene by the presence of functional groups on the surface or edge of the graphene that contain elements other than carbon and hydrogen. In some embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In some embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbonaceous material is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbonaceous material is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbonaceous material is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single of nanomaterial as described above. In this context, "a single of nanomaterial" may refer to a single type of carbon nanomaterial (e.g., only graphene, only carbon nanotubes, etc.), particles which have substantially the same shape, particles which have substantially the same size, or any combination of these. In some embodiments, mixtures of carbon nanomaterials are used are used. In some embodiments, the carbonaceous material is a fluid catalytic cracking coke.

In some embodiments, the sorbent particles include 8.0 to 50.0 atom %, carbon, based on a total number of atoms of sorbent particles. For example, the sorbent particles can include 8.0 atom %, 8.5 atom %, 9.0 atom %, 9.5 atom %, 10.0 atom %, 10.5 atom %, 11.0 atom %, 11.5 atom %, 12.0 atom %, 12.5 atom %, 13.0 atom %, 13.5 atom %, 14.0 atom %, 14.5 atom %, 15.0 atom %, 15.5 atom %, 16.0 atom %, 16.5 atom %, 17.0 atom %, 17.5 atom %, 18.0 atom %, 18.5 atom %, 19.0 atom %, 19.5 atom %, 20.0 atom %, 20.5 atom %, 21.0 atom %, 21.5 atom %, 22.0 atom %, 22.5 atom %, 23.0 atom %, 23.5 atom %, 24.0 atom %, 24.5 atom %, 25.0 atom %, 25.5 atom %, 26.0 atom %, 26.5 atom %, 27.0 atom %, 27.5 atom %, 28.0 atom %, 28.5 atom %, 29.0 atom %, 29.5 atom %, 30.0 atom %, 31.0 atom %, 32.0 atom %, 33.0 atom %, 34.0 atom %, 35.0 atom %, 36.0 atom %, 37.0 atom %, 38.0 atom %, 39.0 atom %, 40.0 atom %, 41.0 atom %, 42.0 atom %, 43.0 atom %, 44.0 atom %, 45.0 atom %, 46.0 atom %, 47.0 atom %, 48.0 atom %, 49.0 atom %, or 50.0 atom % carbon. In some embodiments, the sorbent particles include 17.7 atom % carbon, based on a total number of atoms of sorbent particles. In some embodiments, the sorbent particles include 21.8 atom % carbon, based on a total number of atoms of sorbent particles. In some embodiments, the sorbent particles include 26.6 atom % carbon, based on a total number of atoms of sorbent particles.

In some embodiments, the sorbent particles have a silicon to aluminum atomic ratio of 2.70 to 4.50. For example, the sorbent particles may have a silicon to aluminum ratio of 2.70, 2.75, 2.80, 2.85, 2.90, 2.95, 3.00, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4.00, 4.05, 4.10, 4.15, 4.20, 4.25, 4.30, 4.35, 4.40, 4.45, or 4.50. In some embodiments, the sorbent particles have a silicon to aluminum atomic ratio of 3.10. In some embodiments, the sorbent particles have a silicon to aluminum atomic ratio of 3.11. In some embodiments, the sorbent particles have a silicon to aluminum atomic ratio of 3.79.

In some embodiments, the sorbent particles have a Brunauer-Emmett-Teller (BET) surface area of 115 to 150 square meter per gram ($m^2/g$). For example, the sorbent particles may have a BET surface area of 115.0 $m^2/g$, 117.5 $m^2/g$, 120.0 $m^2/g$, 122.5 $m^2/g$, 125.0 $m^2/g$, 127.5 $m^2/g$, 130.0 $m^2/g$, 132.5 $m^2/g$, 135.0 $m^2/g$, 137.5 $m^2/g$, 140.0 $m^2/g$, 142.5 $m^2/g$, 145.0 $m^2/g$, 147.5 $m^2/g$, or 150.0 $m^2/g$.

In some embodiments, the sorbent particles have a pore volume of 0.1500 to 0.1850 cubic meter per gram ($cm^3/g$). For example, the sorbent particles may have a pore volume of 0.1500 $cm^3/g$, 0.1525 $cm^3/g$, 0.1550 $cm^3/g$, 0.1575 $cm^3/g$, 0.1600 $cm^3/g$, 0.1625 $cm^3/g$, 0.1650 $cm^3/g$, 0.1675 $cm^3/g$, 0.1700 $cm^3/g$, 0.1725 $cm^3/g$, 0.1750 $cm^3/g$, 0.1775 $cm^3/g$, 0.1800 $cm^3/g$, 0.1825 $cm^3/g$, or 0.1850 $cm^3/g$.

In some embodiments, the sorbent particles have a mean pore size of 4.75 to 6.00 nanometers (nm). For example, the sorbent particles may have a mean pore size of 4.75 nm, 4.80 nm, 4.85 nm, 4.90 nm, 4.95 nm, 5.00 nm, 5.05 nm, 5.10 nm, 5.15 nm, 5.20 nm, 5.25 nm, 5.30 nm, 5.35 nm, 5.40 nm, 5.45 nm, 5.50 nm, 5.55 nm, 5.60 nm, 5.65 nm, 5.70 nm, 5.75 nm, 5.80 nm, 5.85 nm, 5.90 nm, 5.95 nm, or 6.00 nm.

In general, the sorbent particles can be any shape known to one of ordinary skill in the art. Examples of suitable shapes the sorbent particles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), belts (also known as nanobelts), ribbons (also known as nanoribbons), and mixtures thereof. In the case of nanorods, the rod shape may be defined by a ratio of a rod length to a rod width, the ratio being known as the aspect ratio. For sorbent particles of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the sorbent particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of sorbent particles having a different shape. As used herein, the term "non-uniform shape" refers to an average consistent shape that differs by more than 10% of the distribution of sorbent particles having a different shape. In one embodiment, the shape is uniform and at least 90% of the sorbent particles are spherical or substantially circular, and less than 10% are polygonal. In another embodiment, the shape is non-uniform and less than 90% of the sorbent particles are spherical or substantially circular, and greater than 10% are polygonal.

In some embodiments, the sorbent particles have a mean particle size of 25 to 400 micrometers (μm). For example, the sorbent particles may have a mean particle size of 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 105 μm, 110 μm, 115 μm, 120 μm, 125 μm, 130 μm, 135 μm, 140 μm, 145 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 325 μm, 350 μm, 375 μm, or 400 μm. In embodiments where the sorbent particles are spherical, the particle size may refer to a particle diameter. In embodiments where the sorbent particles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the sorbent particles have an anisotropic shape such as nanorods, the particle size may refer to a length of the nanorod, a width of the nanorod, or an average of the length and width of the nanorod. In some embodiments in which the sorbent particles have non-spherical shapes, the particle size refers to the diameter of a sphere having an equivalent volume as the particle. In some embodiments in which the sorbent particles have non-spherical shapes, the particle size refers to the diameter of a sphere having an equivalent diffusion coefficient as the particle.

In some embodiments, the sorbent particles of the present disclosure are monodisperse, having a coefficient of variation or relative standard deviation, expressed as a percentage and defined as the ratio of the particle size standard deviation (a) to the particle size mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the sorbent particles of the present disclosure are monodisperse having a particle size distribution ranging from 80% of the average particle size to 120% of the average particle size, preferably 90-110%, preferably 95-105% of the average particle size. In some embodiments, the sorbent particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the sorbent particles further include a silica coating disposed on a surface of the porous aluminosilicate material and a surface of the carbonaceous material. In some embodiments, the porous aluminosilicate material and carbonaceous material may have at least one layer of the silica coating deposited on the surface. Such a silica coating may be deposited in a layer which partially or wholly covers the surface of the porous aluminosilicate material and carbonaceous material. In some embodiments, the layer is uniform and continuous manner.

In some embodiments, the filtration membrane further includes a polymer support. In general, the polymer support may be formed of any suitable polymer known to one or ordinary skill in the art. Examples of suitable polymers include, but are not limited to polyethylene, polystyrene, polyvinyl chloride (PVC), polyacrylonitrile (PAN), polymethyl methacrylate (PMMA), polyethylene terephthalate (PET), polyamide (nylon), polyurethane, polytetrafluoroethylene (PTFE), polycarbonate, polysulfone, polyetheretherketone (PEEK), polyvinyl alcohol (PVA), polyphenylene sulfide (PPS), polyimide, polypropylene oxide, polyhydroxyethylmethacrylate (PHEMA), poly(diallyl dimethyl ammonium chloride) (PDADMAC), polyvinylidene fluoride (PVDF), polydimethylsiloxane (PDMS), polyethylenimine (PEI), polytetrafluoroethylene (PTFE), poly(2-hydroxyethyl methacrylate) (PHEMA), polyaniline, polybutylene terephthalate (PBT), polycaprolactone (PCL), polytriazole, polyethylene glycol (PEG), polyvinyl butyral (PVB), and poly(ethylene-co-vinyl acetate) (EVA). In some embodiments, the polymer support is a polypropylene support.

In some embodiments, the polymer support has a mean pore size of 0.10 to 0.50 μm, preferably 0.15 to 0.40 μm, preferably 0.20 to 0.30 μm, preferably 0.22 μm.

The present disclosure also relates to a method of forming the filtration membrane. In some embodiments, the method includes washing a spent fluid catalytic cracking catalyst with an alcohol having 1 to 5 carbon atoms to form an untreated aluminosilicate material. Suitable examples of the alcohols include, but are not limited to, ethanol, methanol, isopropanol, n-butanol and a combination of thereof. In a preferred embodiment, the alcohol used for washing the spent fluid catalytic cracking catalyst is methanol. Washing the spent fluid catalytic cracking catalyst with the alcohol may be advantageous for removing organic pollutants, restoring the catalyst's surface, preserving the catalyst performance, and/or preparing the catalyst for reuse or further treatment.

In some embodiments, the method, further includes solvothermally treating a coating mixture including the untreated aluminosilicate material and an organosilane to form an intermediate. In some embodiments, the solvothermal treatment is performed at a temperature of 75 to 125° C., preferably 80 to 120° C., preferably 90° C. for 8 to 48 hours, preferably 10 to 40 hours, preferably 20 to 30 hours, preferably 24 hours. Suitable organosilanes such as trimethoxy(phenyl)silane, methyltrimethoxysilane, minopropyltriethoxysilane, vinyltriethoxysilane, glycidyloxypropyltrimethoxysilane, and mixtures of these may also be used. In some embodiments, the organosilane is tetraethoxysilane. In some embodiments, the coating mixture has a weight ratio of the untreated aluminosilicate material to the organosilane of 2:1 to 1:2, preferably about 1.5:1 to 1:1.5.

In some embodiments, the method further includes, calcining the untreated aluminosilicate material or the intermediate to form a treated aluminosilicate material. In some embodiments, the calcining can be performed at a temperature of 500 to 750° C., preferably 550 to 700° C., preferably 600° C. for 1 to 12 hours, preferably 2-8 hours, preferably 4 to 7 hours, preferably 6 hours. In some embodiments, the calcination is carried out by heating it to a high temperature under a restricted supply of oxygen. The calcination may be advantageous for removing impurities or volatile substances and to incur thermal decomposition or reaction. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min.

In some embodiments, the method includes disposing the untreated aluminosilicate material or the treated aluminosilicate material (where calcination is performed) on the polymer support to form the filtration membrane. In some embodiments, the untreated aluminosilicate material is evenly spread onto the polymer support using a slurry deposition method. In some embodiments, the aluminosilicate material is mixed with a binder before being applied to the polymer support. The binder may be advantageous for improved adhesion. In some embodiments, the polymer support is coated with the aluminosilicate material by dipping, followed by drying to ensure uniform coverage. In some embodiments, the untreated aluminosilicate material is deposited onto the polymer support using a spray-coating technique for precise control over material distribution. In some embodiments, the polymer support is pre-heated before applying the aluminosilicate material to enhance bonding.

FIG. 1A illustrates a schematic flow chart of a method 50 of removing an organic pollutant from water. The order in which the method 50 is described is not intended to be construed as a limitation, and any number of the described method steps may be combined in any order to implement the method 50. Additionally, individual steps may be removed or skipped from the method 50 without departing from the spirit and scope of the present disclosure.

At step 52, the method 50 includes contacting a contaminated water with a filtration membrane to form a contaminated membrane. The contaminated water may include, but is not limited to, polluted river water, groundwater tainted with pesticides and fertilizers, sewage-contaminated water in urban areas, oil-spilled water in oceans, and lakes contaminated with industrial chemicals. Sources of the contaminated water may include, but are not limited to, industrial discharges, agricultural runoff containing pesticides and fertilizers, untreated sewage from urban areas, oil spills from ships and rigs, leachate from landfills, and chemical waste from factories. Additionally, mining activities, deforestation, and improper disposal of household chemicals also contribute to water contamination.

In general, the contaminated water may be contacted with the filtration membrane in any suitable configuration for form. In some embodiments, the contaminated water may be passed through a series of filtration membranes to increase contact time, allowing for enhanced adsorption of the organic pollutants. In some embodiments, the filtration membrane may be periodically cleaned or regenerated by backwashing or using a solvent to remove accumulated pollutants, extending the membrane's effectiveness. In further embodiments, additional purification steps such as UV treatment or chemical coagulation may be applied after filtration to remove residual contaminants. In some embodiments, a filtration system may be designed with multiple layers of sorbent particles, each enhanced for different pollutant types, allowing for selective removal.

At step 54, the method 50 includes collecting a purified water. When the contaminated water passes through the filtration membrane, purified water may be separated and collected in a designated collection tank or reservoir. In some embodiments, a drainage or discharge system may be used to remove the treated water, ensuring it flows into a clean storage area. In such embodiments, clean water may be collected through gravity flow, or by using pumps to transfer the purified water from a filtration unit into a storage system.

In some embodiments, the organic pollutant is at least one selected from the group consisting of a dye, a phenol, a polycyclic aromatic hydrocarbon, an herbicide, a pesticide, and a persistent organic pollutant. In some embodiments, the organic pollutant is at least one selected from isoprocarb, atrazine, primicarb, penconazole, chlorfenapr, and mefenacet.

Figure 1B:
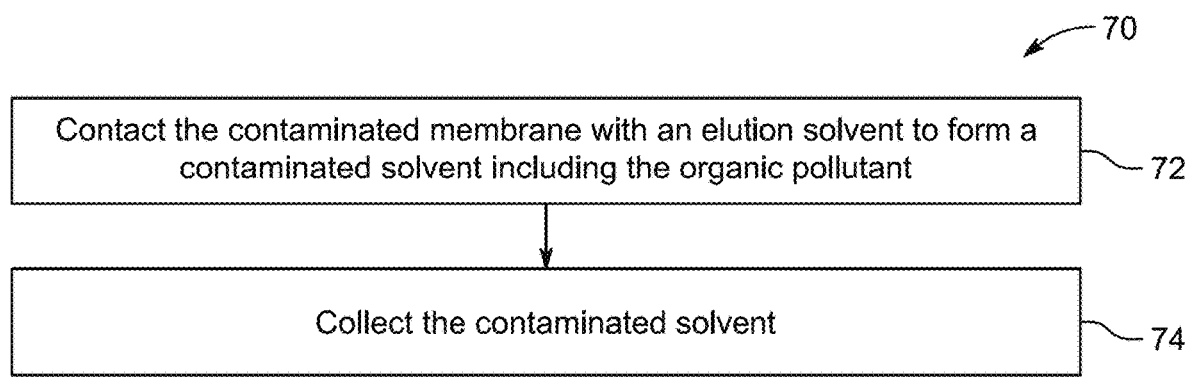
FIG. 1B is a schematic flowchart of a method of recovering the organic pollutant, according to certain embodiments.

FIG. 1B illustrates a schematic flow chart of a method 70 of recovering the organic pollutant. The order in which the method 70 is described is not intended to be construed as a limitation, and any number of the described method steps may be combined in any order to implement the method 70. Additionally, individual steps may be removed or skipped from the method 70 without departing from the spirit and scope of the present disclosure.

At step 72, the method 70 includes contacting the contaminated membrane with an elution solvent to form a contaminated solvent including the organic pollutant. In some embodiments, the contaminated membrane is contacted with the elution solvent at room temperature to remove the organic pollutants. In some embodiments, the elution solvent is heated before being applied to the contaminated membrane to enhance the solubilization of the organic pollutants.

In some embodiments, the elution solvent is applied under pressure to increase interaction with the membrane. In some embodiments, the contaminated membrane is soaked in the elution solvent for an extended period. In some embodiments, the elution solvent is at least one selected from the group consisting of 2-propanol, acetone, methylene chloride, chloroform, methanol, and ethyl acetate. In some embodiments, the elution solvent may include, but is not limited to, acetonitrile, hexane, toluene, ethanol, water, butanol, diethyl ether, 1,4-dioxane, cyclohexane, benzene, methyl tert-butyl ether (MTBE), dimethyl sulfoxide (DMSO), formic acid, triethylamine, acetic acid, propanol, 2-butanol, heptane, xylene, acetonitrile-water mixture, sodium bicarbonate solution, tetrahydrofuran (THF), ethylene glycol, propylene glycol, dimethylformamide (DMF), nitromethane, ammonium hydroxide, sodium hydroxide, hexane-ethyl acetate mixture, chlorobenzene, N,N-dimethylacetamide (DMA), and formamide.

At step 74, the method 70 includes collecting the contaminated solvent. The contaminated solvent includes 80 to greater than 99.99%, preferably 84.9% to 99.5% of an initial amount of organic pollutant present in the contaminated water. The method removes greater than 97.5% of an initial amount of the organic pollutant.

The following examples are provided solely for illustration and are not to be construed as limitations of the present disclosure, as many variations thereof are possible without departing from the spirit and scope of the present disclosure.

EXAMPLES

The following examples demonstrate a fluid catalytic cracking (FCC) catalyst as described herein. The examples are provided solely for illustration and are not to be construed as limitations of the present disclosure, as many variations thereof are possible without departing from the spirit and scope of the present disclosure.

Example 1: Materials and Chemicals

The pesticide residues, including isoprocarb, atrazine, primicarb, penconazole, chlorfenapr, and mefenacet, were procured from HPC Standards GmbH. Solvents were sourced as follows: Acetone from EMSURE, methylene chloride, chloroform, ethyl acetate and methanol from Sigma-Aldrich, and toluene from Honeywell. The wastewater was sourced from the Alkhobar sewage plant, Saudi Arabia prior to its discharge into the Corniche Sea. Deionized water used in the disclosure was processed in-house using equipment from VWR International. A 0.22 μm porosity polypropylene membrane was obtained from Tisch Scientific Company.

Example 2: Pretreatments of the Spent Fluid Catalytic Cracking (FCC) Catalyst The FCC spent catalyst was sourced from a local refinery in the Kingdom of Saudi Arabia. A total of 10 g of the spent catalyst was washed three times with a 200 mL water-methanol solution to remove petroleum products and metal contaminants that were adsorbed on the spent catalyst, then dried in an oven at 100 degree Celsius (° C.) for 6 hours. The dried spent catalyst was divided into three portions: the first portion was used without further modification and is labeled as spent catalyst; the second portion was calcined in a muffle furnace to remove deposited coke on the catalyst, thus is labeled regenerated catalyst. The calcination process involved ramping the temperature at 2 Celsius per minute (° C./min) up to 100° C., followed by 5° C./min from 100° C. to 600° C., and maintaining 600° C. for 6 hours. The third portion of the dried spent catalyst was modified via silica encapsulation using a sol-gel approach, with the deposited coke acting as a hard template. For the modification, 4 g of the dried spent catalyst was dispersed in a mixture of 3.85 g tetraethoxysilane, 22 mL deionized water, and 6 mL ethanol. After stirring for 8 hours, the mixture was transferred to a Teflon-lined autoclave and heated at 90° C. for 24 hours. The resulting solution was centrifuged, and the powder obtained was washed three times with deionized water, dried at 100° C., and calcined at 600° C. for 6 hours to form catalyst@silica material. Fresh ultra-stable Y (USY) zeolite was used as a reference fresh FCC catalyst. Consequently, the disclosure evaluated the performance of four types of materials as sorbents: the spent catalyst, regenerated catalyst, catalyst@silica, and USY zeolite.

Example 3: Characterization Methods

Various characterization methods were employed to study the physico-chemical properties of the spent catalyst, regenerated catalyst, catalyst@silica, and USY zeolite. X-ray diffraction (XRD) analysis was performed using a diffractometer with a Cu anode (Rigaku, Ultima IV) operating at 40 kilovolt (kV) and 30 mega amperes (mA) to evaluate the crystallinity of the materials. The functional groups on the surface were examined using Nicolet 6700 Thermo electron Fourier transform infrared spectroscopy (FTIR). Energy-dispersive X-ray spectroscopy (JEOL 6700LV) and a Field Emission Scanning Electron Microscope (FE-SEM) were used for surface morphology and elemental analysis. Porosity parameters were measured using nitrogen adsorption/desorption studies with a Micromeritics asap-2000 porosity analyzer (Micrometrics, USA). The Brunauer-Emmett-Teller (BET) method was employed to compute the surface area, while the Barret, Joyner, and Halenda (BJH) method calculated pore size and pore volume distribution. The adsorbents were degassed for 3 hours at 250° C. in a vacuum-sealed tube to remove moisture and impurities prior to measurement.

Example 4: Micro Solid Phase Extraction (SPE) Procedure

In a typical membrane-supported micro-SPE procedure, a polypropylene membrane measuring 0.5 cm by 0.5 cm is sealed on three sides using a standard sealing instrument [A. Tanimu, S. Muhammad Sajid Jillani, S. A. Ganiyu, S. Chowdhury, K. Alhooshani, Multivariate optimization of chlorinated hydrocarbons' micro-solid-phase extraction from wastewater using germania-decorated mesoporous alumina-silica sorbent and analysis by GC-MS, Microchemical Journal 160 (2021) 105674, incorporated herein by reference in its entirety]. Subsequently, a magnet and sorbent material are introduced into the sealed membrane, and the fourth side is sealed to form a bag. This bag is then activated with toluene, a step that is visually confirmed by the transformation of the bag from a white color to a transparent state. Following activation, the bag is placed into the sample, where extraction occurs as the analyte migrates from the sample and adsorbs onto the sorbent. After extraction, the bag is removed, dried with lab tissue, and placed in a minimal amount of organic solvent 200 (microliter) μL-500 μL. The system is then sonicated for a specified duration, facilitating desorption as the target analyte is released from the sorbent and dissolves in the organic solvent. With the analyte now separated from the matrix and concentrated in a minimal volume of organic solvent, the final step involves injecting it into a gas chromatograph (GC) for data collection.

Characterization was carried out through a univariate approach, examining four types of sorbents: spent catalyst, regenerated catalyst, catalyst@silica, and USY zeolite. The investigation involved testing and fine-tuning both the selection of the sorbent and its quantity, ranging from 5 mg to 40 mg. The extraction step was systematically studied over varying time intervals, spanning 5 minutes to 25 minutes. Concurrently, the desorption phase was investigated for its duration (ranging from 5 minutes to 35 minutes), choice of desorption solvents (including acetone, methylene chloride, chloroform, ethyl acetate, and methanol), and solvent quantity (ranging from 200 µL to 600 µL). This comprehensive exploration process was aimed at identifying the most effective extraction and desorption steps of the micro-SPE.

Example 5: Gas Chromatography-Mass Spectrometry (GC-MS) Analysis

The identification and quantification of target analytes were conducted using an Agilent 7890A GC-System coupled with an MS-5975C inert MSD equipped with a triple-axis detector. The system featured an Agilent GC-Sampler 80 autosampler and injector. Separation of the target analytes was accomplished using an Agilent 19091J-413 MS column, which has a thickness of 0.25 µm, a length of 30.0 m, and a diameter of 0.32 mm. The GC inlet and auxiliary heater were kept at 300° C. High-purity helium was used as the carrier gas at a flow rate of 1.2 milliliter per minute (mL/min). The GC injection port and GC-MS interface temperatures were set at 250° C., with the ion source temperature fixed at 230° C. The oven temperature program was as follows: the initial temperature of 40° C. was maintained for 2 minutes, then ramped at 10° C./min to 100° C., held for 1 minute. The temperature was then increased to 260° C. at 10° C./min and held for 1 minute, followed by another increase to 280° C. at 10° C./min and held for 1 minute, making the total run time 29 minutes. Analytes were introduced into the GC column using the split less injection mode throughout the study. For qualitative analysis, data acquisition was performed in scan mode to confirm the retention times of the target analytes. For quantitative analysis, selective ion monitoring (SIM) mode was used, with the selected ion peaks for each nitrosamine specified in table 1.

TABLE 1

Target compounds, retention time (min) and selected target ions for SIM mode.

| Retention time (min) | Target compounds | Selected target ions |
|---|---|---|
| 14.649 | Isoprocarb | 121, 136, 91 |
| 17.049 | Atrazine | 200, 215, 58 |
| 18.17 | Primicarb | 166, 72, 238 |
| 20.163 | Penconazole | 248, 159, 161 |
| 21.76 | Chlorfenapr | 59, 247, 75 |
| 24.443 | Mefenacet | 192, 123, 90 |

Example 7: Analytical Method Validation and Real Sample Analysis

Method validation involved generating a calibration curve and determining linear equations along with R-squared values. Furthermore, the limit of detection (LOD) and the limit of quantification were computed using the equations below:

$$LOD = 3 \times \frac{\text{signal}}{\text{noise}} \quad (1)$$

$$LOQ = 10 \times \frac{\text{signal}}{\text{noise}} \quad (2)$$

Example 8: Powder X-Ray Diffraction (PXRD)

Figure 2A:
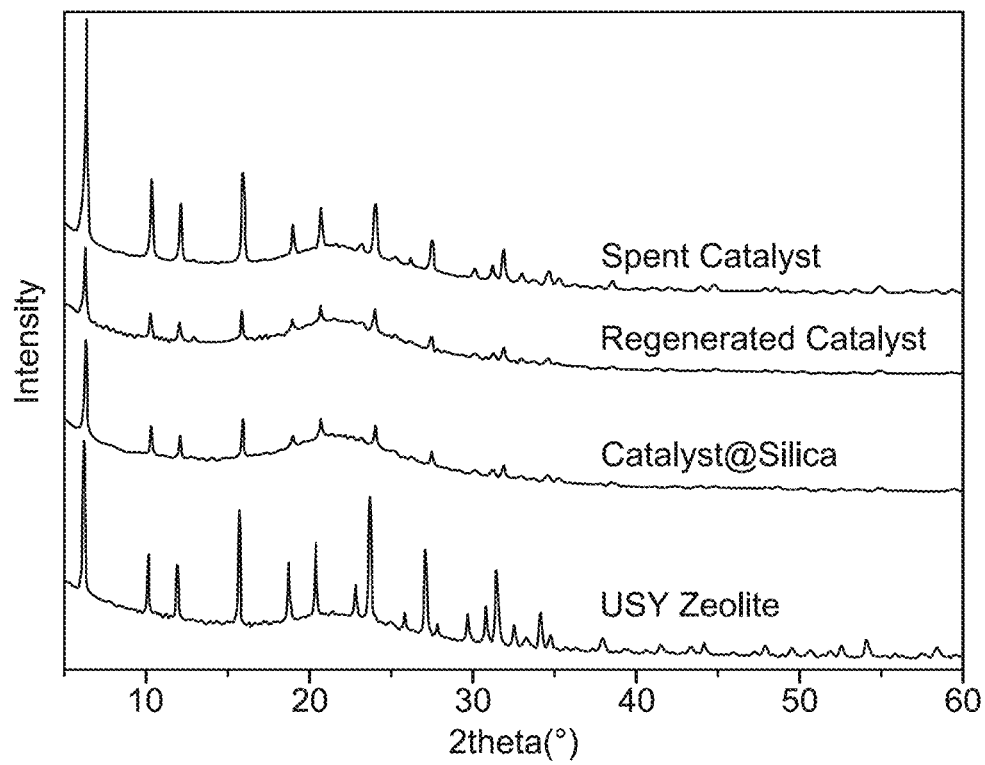
FIG. 2A depicts a powder X-ray diffraction (PXRD) image of sorbent materials, according to certain embodiments.

The PXRD for all the sorbent materials show the patterns of USY zeolite, although at different peak intensity level, as shown in FIG. 2A [Yosra Ghrib, Najoua Frini-Srasra, Ezzeddine Srasra, Joaquin Martinez-Triguero, Avelino Corma, Synthesis of cocrystallized USY/ZSM-5 zeolites from kaolin and its use as fluid catalytic cracking catalysts, Catal Sci Technol 8 (2018) 716-725, incorporated herein by reference in its entirety]. The peak intensity, indicative of material crystallinity, is highest in the USY zeolite, which indicates that it is pure zeolite material. The XRD of the spent catalyst shows good peak resolution, however, upon catalyst regeneration by calcination, a reduction in crystallinity was observed, accompanied by the loss of specific crystal faces. This phenomenon is observed in the pattern of the catalyst@silica, suggesting that the polymeric silicon cover introduced during the modification process may be responsible for obscuring the crystal faces [D. Munir, M. R. Usman, Catalytic hydropyrolysis of a model municipal waste plastic mixture over composite USY/SBA-16 catalysts, J Anal Appl Pyrolysis 135 (2018) 44-53, incorporated herein by reference in its entirety].

Example 9: Fourier Transform Infrared Spectroscopy (FTIR)

Figure 2B:
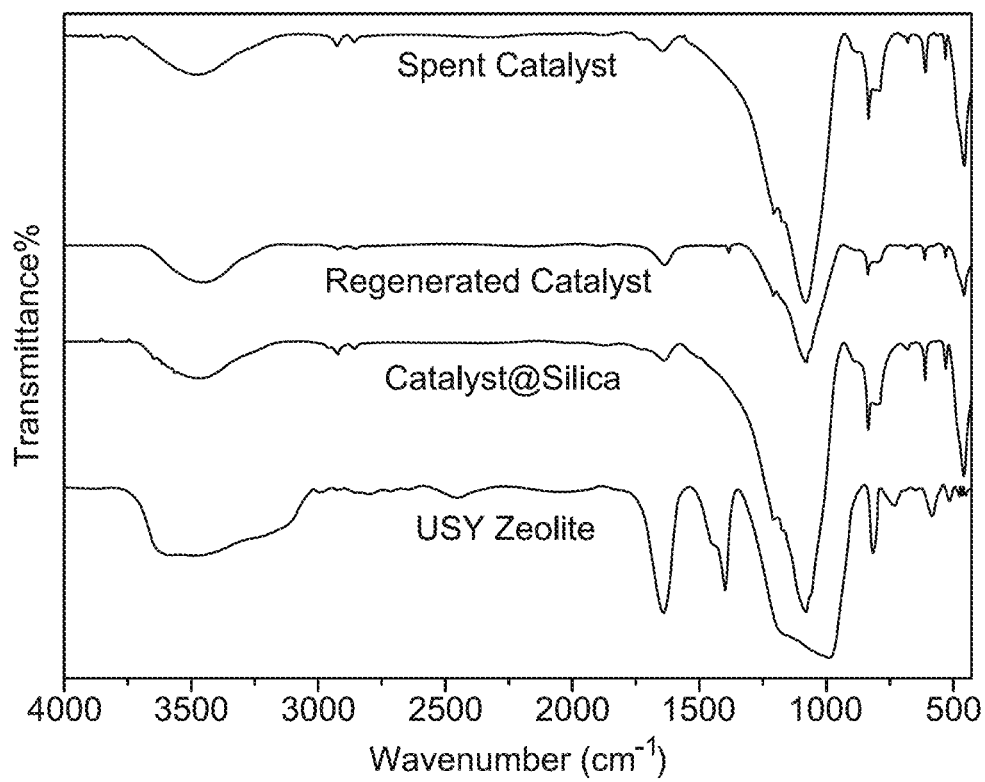
FIG. 2B depicts a Fourier transform infrared spectroscopy (FTIR) image of sorbent materials, according to certain embodiments.

The FTIR spectrum, as shown in FIG. 2B, clearly depicts an O—H stretching band at 3500 wavenumbers ($cm^{-1}$), indicating the presence of hydroxyl groups. Other identifiable features include the O—H bend at (1625 $cm^{-1}$-1600 $cm^{-1}$) associated with absorbed water, the Si(Al)—O—Si (Al) stretching at (1140 $cm^{-1}$-955 $cm^{-1}$), the external Si(Al)—O absorption at (700 $cm^{-1}$-800 $cm^{-1}$), and the internal Si(Al)—O absorption at (420 $cm^{-1}$-500 $cm^{-1}$) [J. Zhao, Y. Yin, Y. Li, W. Chen, B. Liu, Synthesis and characterization of mesoporous zeolite Y by using block copolymers as templates, Chemical Engineering Journal 284 (2016) 405-411, incorporated herein by reference in its entirety].

Example 10: Nitrogen ($N_2$) Adsorption-Desorption Isotherm

Figure 2C:
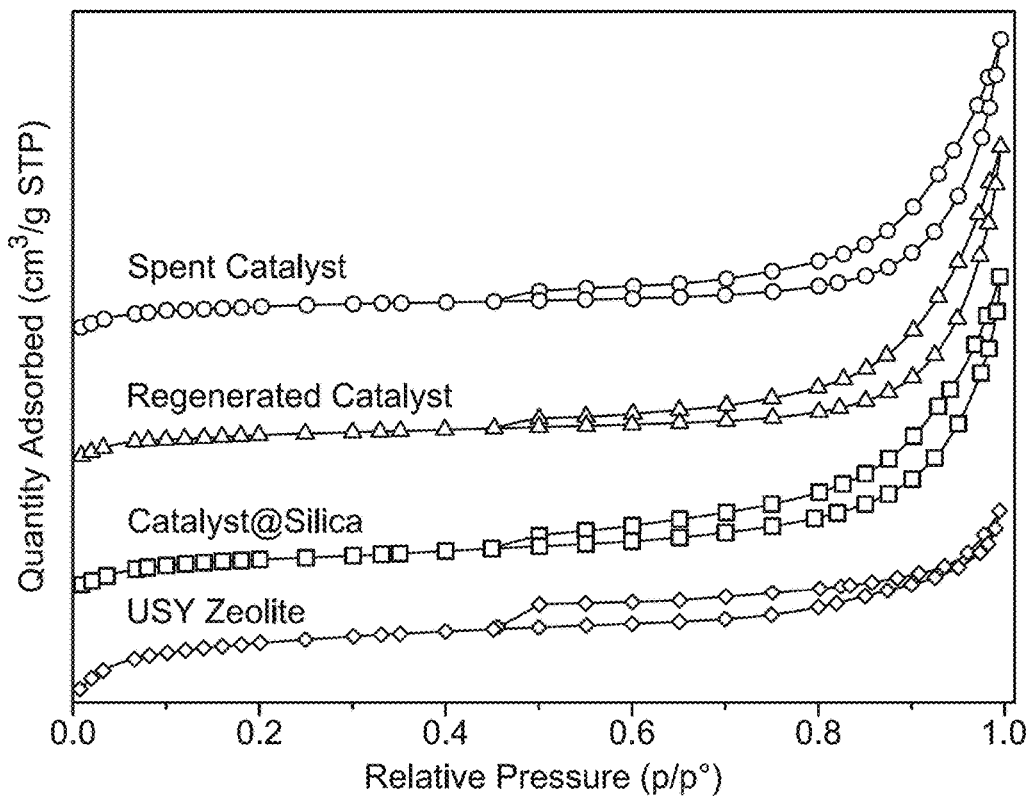
FIG. 2C depicts a nitrogen ($N_2$) adsorption-desorption isotherm image of sorbent materials, according to certain embodiments.
Figure 3A:
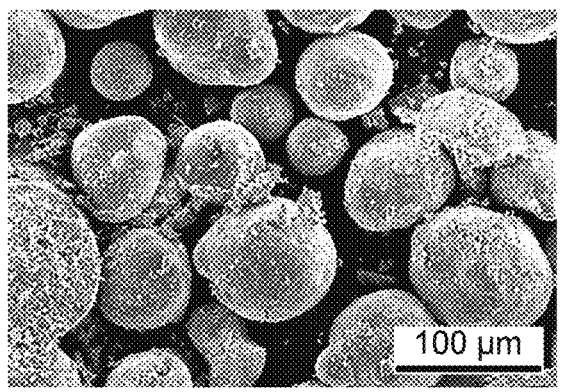
FIG. 3A depicts a scanning electron microscope (SEM image) at 500× magnification of spent catalyst, according to certain embodiments.
Figure 3B:
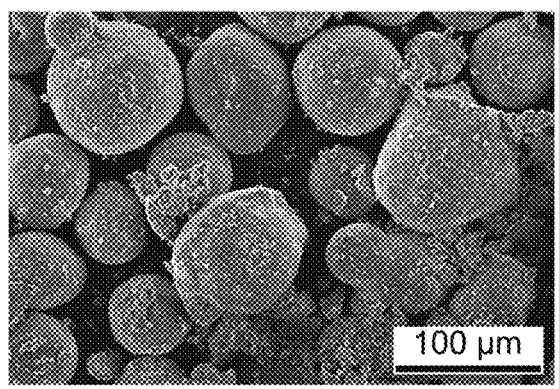
FIG. 3B depicts a SEM image at 500× magnification of regenerated catalyst, according to certain embodiments.
Figure 3C:
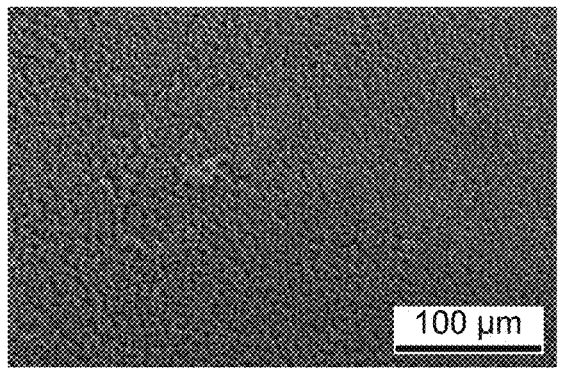
FIG. 3C depicts a SEM image at 500× magnification of ultra-stable Y (USY) zeolite, according to certain embodiments.
Figure 3D:
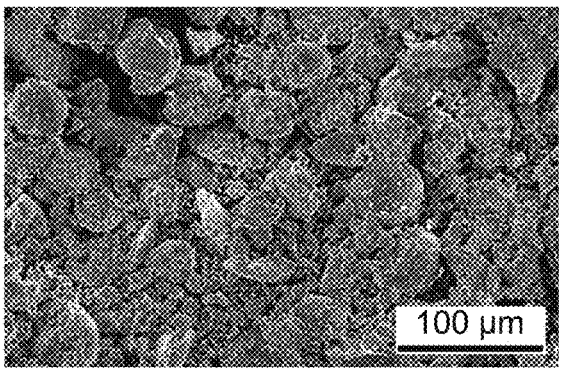
FIG. 3D depicts a SEM image at 500× magnification of catalyst@silica, according to certain embodiments.

The nitrogen adsorption-desorption isotherms for the various sorbents, presented in FIG. 2C, highlight notable differences in adsorption capacities at different relative pressures actual pressure/reference pressure (p/p°). The spent catalyst shows the highest adsorption capacity across all relative pressures, indicating a well-developed porous structure with a high surface area, making it highly effective for pesticides adsorption [S. Bose, P. Senthil Kumar, G. Rangasamy, G. Prasannamedha, S. Kanmani, A review on the applicability of adsorption techniques for remediation of recalcitrant pesticides, Chemosphere 313 (2023) 137481, incorporated herein by reference in its entirety]. This indicates a mix of microporous and mesoporous features, which facilitate efficient pesticides molecules trapping. All the sorbents exhibit type IV isotherms, indicating the presence of mesopores. Most sorbents, except USY zeolite, display hysteresis loops characteristic of type H3, associated with wedge-like pores. In contrast, USY zeolite shows a type H4 hysteresis loop, associated with slit-like pores. The regenerated catalyst demonstrates moderate adsorption capacity, higher than catalyst@silica and USY zeolite but lower than the spent catalyst, suggesting that the regeneration process restores some but not all adsorption capacity. Catalyst@silica shows intermediate adsorption capacity, better than USY zeolite but less effective than both regenerated and spent catalysts, indicating the presence of mesopores that aid pesticide adsorption, though not as efficiently as the spent catalyst. Finally, USY zeolite has the lowest adsorption capacity among the tested sorbents, with its isotherm suggesting a more microporous structure with limited surface area and pore volume for pesticide adsorption [K. H. Chung, High-pressure hydrogen storage on microporous zeolites with varying pore properties, Energy 35 (2010) 2235-2241, incorporated herein by reference in its entirety]. This is further observed in the microporous surface area ($m^2/g$) and pore size (nm) values summarized in table 2.

in FIG. 3A, depicts a rough and irregular surface with spherical particles which is typical morphology of an FCC catalyst, offering abundant active sites for adsorption, which likely contributes to its superior performance [M. R. Gonzalez, A. M. Pereyra, P. Bosch, G. Fetter, V. H. Lara, E. I. Basaldella, Structural and morphological evolutions of spent FCC catalyst pellets toward NaA zeolite, J Mater Sci 51 (2016) 5061-5072, incorporated herein by reference in its entirety]. In contrast, the regenerated catalyst, as shown in FIG. 3B, has a smoother surface, which indicates the absence of coke on the catalyst. This may potentially reduce the available active sites due to coke formation. The USY zeolite, as shown in FIG. 3C, presents a dense, homogeneous texture with fine particles, indicating that it is pure microporous zeolite powder that has not been processed into commercial spray-dried catalyst. The catalyst@silica composite, as shown as FIG. 3D, features a heterogeneous surface with a mix of agglomerates and finer particles, resulting in fewer accessible active sites. This implies that silica modification has ruined the spherical morphology of the FCC catalyst. The energy dispersive x-ray spectroscopy (EDS) analysis of the sorbent materials is summarized in table 3.

TABLE 2

Textural properties of the sorbent materials

| Sorbents | Surface Area ($m^2/g$) | Mesopore surface area ($m^2/g$) | Micropore surface area ($m^2/g$) | Pore Volume ($cm^3/g$) | Micropore volume ($cm^3/g$) | Pore Size (nm) |
|---|---|---|---|---|---|---|
| USY zeolite | 576 | 53 | 523 | 0.3455 | 0.2741 | 2.401 |
| Spent catalyst | 125 | 21 | 105 | 0.1627 | 0.0552 | 5.188 |
| Regenerated catalyst | 127 | 22 | 105 | 0.171 | 0.0553 | 5.388 |
| Catalyst@silica | 132 | 33 | 99 | 0.1709 | 0.0523 | 5.163 |

Example 11: Pore Size Distribution

Figure 2D:
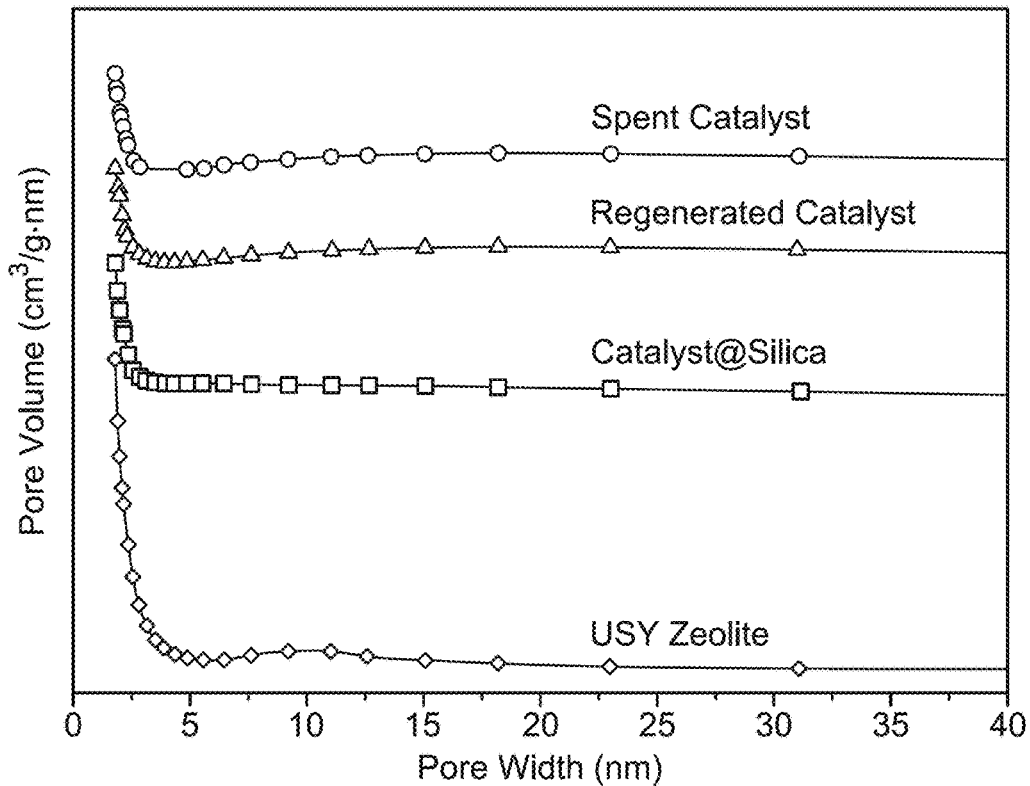
FIG. 2D depicts a pore size distribution plot of sorbent materials, according to certain embodiments.

The pore size distribution curves for the sorbents provide crucial insights into the pore structure and volume, which significantly influence adsorption performance. As shown in FIG. 2D, the spent catalyst displays a broad distribution of pore sizes, including a significant volume of mesopores and some macropores, particularly in the mesopore range of 2 nm to 50 nm, correlating with its high adsorption capacity as larger pores may accommodate more pesticide molecules. The regenerated catalyst shows a similar but slightly narrower pore size distribution compared to the spent catalyst, with mesopores contributing to its moderate adsorption capacity, although some original pore volume might be lost during the regeneration process. Catalyst@silica presents a notable volume of mesopores, though less than that of the spent catalyst, aiding in adsorption but not as effectively due to fewer available pores. Lastly, the USY zeolite features a predominantly microporous structure with limited pore volume in the mesopore range, and the dominance of micropores, as shown in table 2, restricts its adsorption capacity for larger pesticide molecules, as evidenced by its lower performance in the adsorption isotherm.

Example 12: Scanning Electron Microscopy (SEM)

The SEM images at 500× reveal distinct morphological characteristics of the sorbents. The spent catalyst, as shown

TABLE 3

Elemental composition (atomic %) of the sorbent materials Improvement of the extraction process was carried out through a univariate approach.

| Sorbent | Si | Al | C | Si/Al |
|---|---|---|---|---|
| USY zeolite | 29.5 | 11.1 | — | 2.65 |
| Regenerated catalyst | 22.8 | 7.35 | 17.7 | 3.1 |
| Spent catalyst | 21.6 | 6.95 | 21.8 | 3.11 |
| Catalyst@Silica | 21.8 | 8.76 | 26.6 | 3.79 |

Example 13: Sorbent Materials

Figure 4:
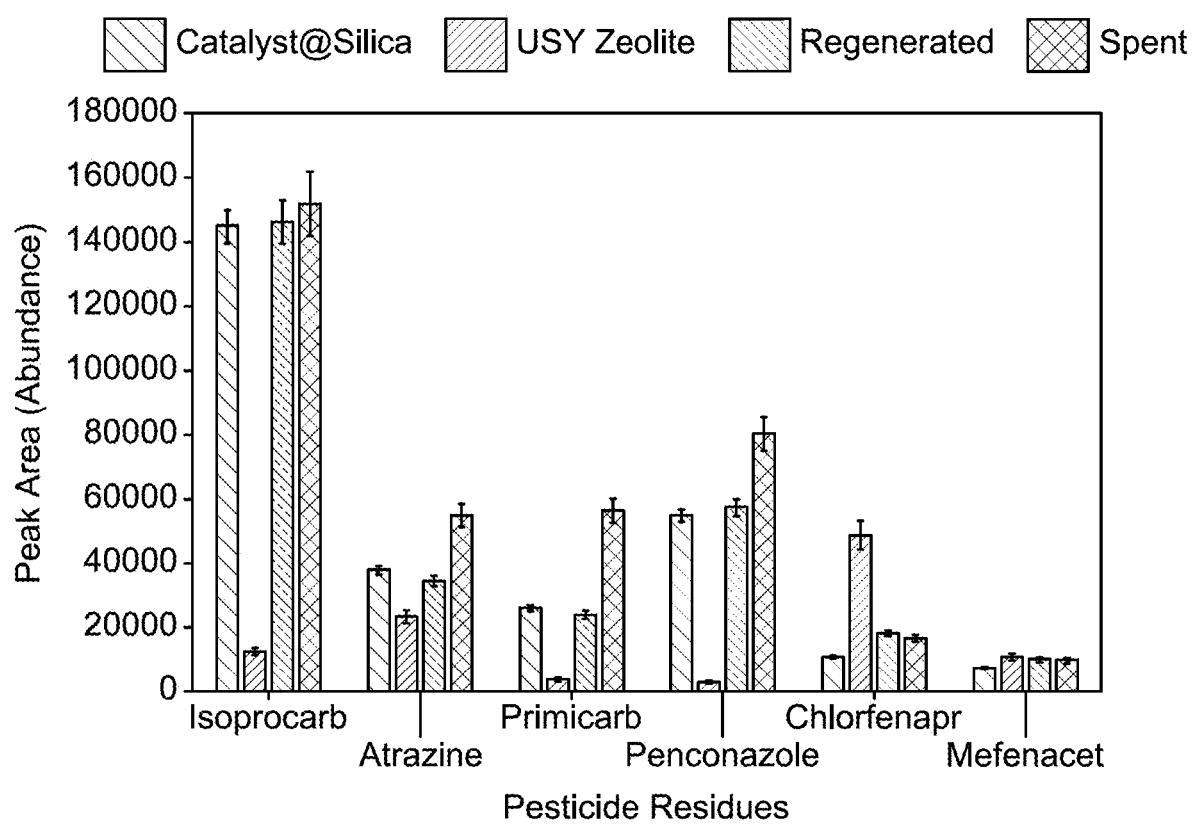
FIG. 4 depicts a plot showing extraction performance of different sorbent materials, according to certain embodiments.

The study employed four distinct sorbents: spent catalyst, regenerated catalyst, catalyst@silica, and USY zeolite, for the extraction of six pesticides, namely isoprocarb, atrazine, primicarb, penconazole, chlorfenapr, and mefenacet. FIG. 4 illustrates that isoprocarb, atrazine, primicarb, and penconazole exhibited optimal extraction when using spent zeolite as the sorbent, with the least effective extraction observed when USY zeolite was employed. Mefenacet demonstrated consistent extraction performance across all sorbents, while chlorfenapr exhibited its highest extraction efficiency when utilizing USY zeolite.

Consequently, the spent catalyst was identified as the most effective sorbent for the disclosure. This performance may be attributed to the hydrophilic nature of zeolites due to the presence of hydroxyl groups, facilitating hydrogen bonding, coupled with hydrophobic properties within internal channels and cages that contribute to weak electrostatic forces [J. Xu, T. Yin, Y. Li, N. Liu, L. Shi, X. Meng, Synthesis of high hydrophobicity USY zeolite with excellent VOCs adsorption performance under humid condition: Combined strategy of high temperature steam and acid treatment, Sep Purif Technol 329 (2024) 124914, incorporated herein by reference in its entirety]. Additionally, the presence of coke on the surface of the spent catalyst provides multiple functional groups, offering additional adsorption sites and interactions for the pesticides [V. K. Gupta, B. Gupta, A. Rastogi, S. Agarwal, A. Nayak, Pesticides removal from wastewater by activated carbon prepared from waste rubber tire, Water Res 45 (2011) 4047-4055, incorporated herein by reference in its entirety].

Example 14: Sorbent Quantity

Figure 5:
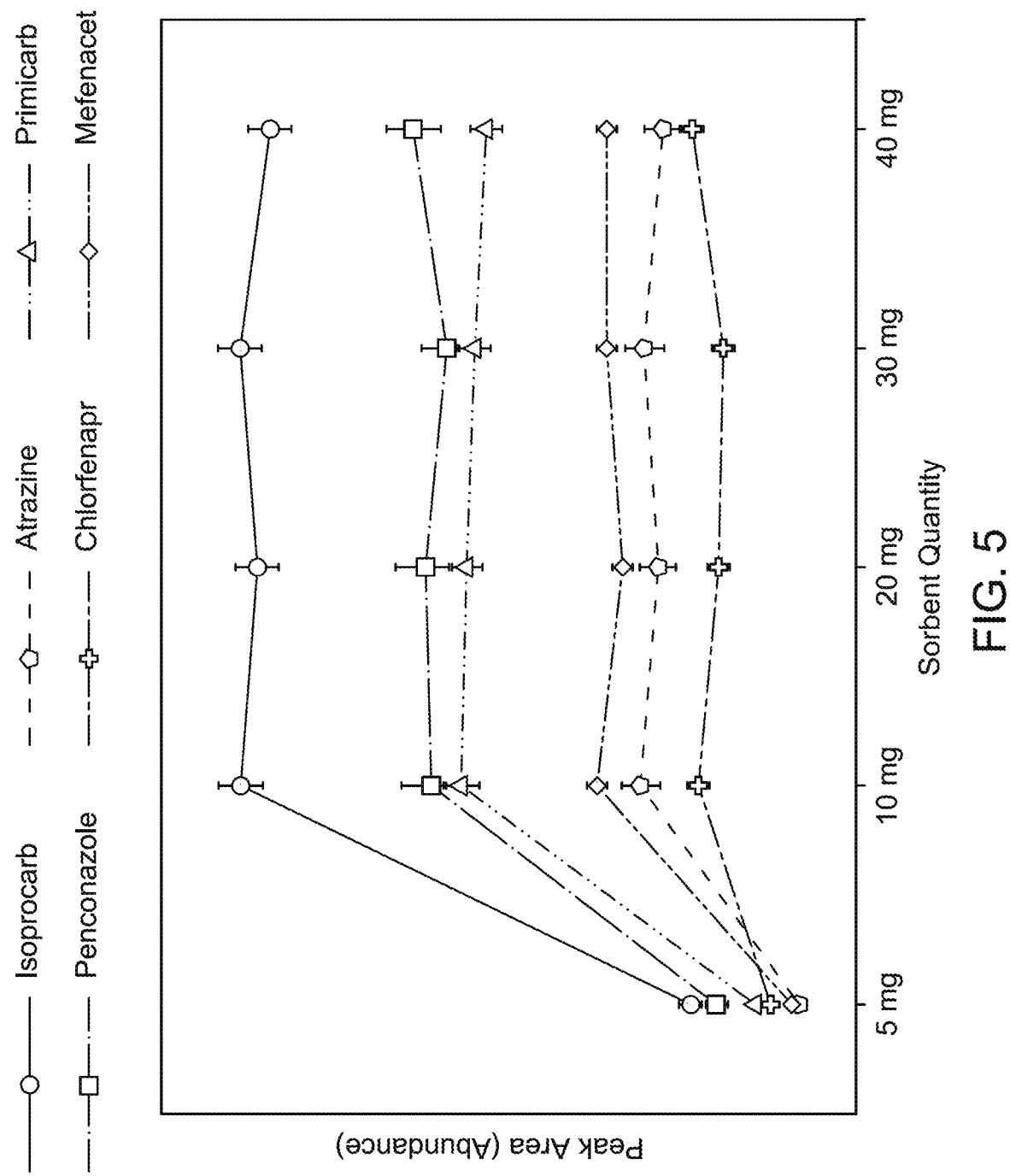
FIG. 5 depicts a plot showing impact of sorbent (spent catalyst) quantity on extraction performance, according to certain embodiments.

The work demonstrates that maintaining a consistent sample size while increasing the sorbent quantity results in enhancing the extraction quantity. However, beyond 10 mg of sorbent, the extraction quantity may be constant. This is attributed to the kinetic nature of the reaction which has reached equilibrium [W. Chai, X. Zhu, W. Liu, W. Zhang, Z. Zhou, Z. Ren, Extraction of aniline from wastewater: equilibria, model, and fitting of apparent extraction equilibrium constants, RSC Adv 6 (2016) 6125-6132, incorporated herein by reference in its entirety]. In other terms, the concentration of pesticides on the sorbent has been constant, and despite the increased absorbent sites with 20 mg, 30 mg, and 40 mg, they are ineffective in altering the equilibrium state. Therefore, 10 mg is determined to be the optimal sorbent quantity as shown in FIG. 5.

Example 15: Extraction Time

Figure 6:
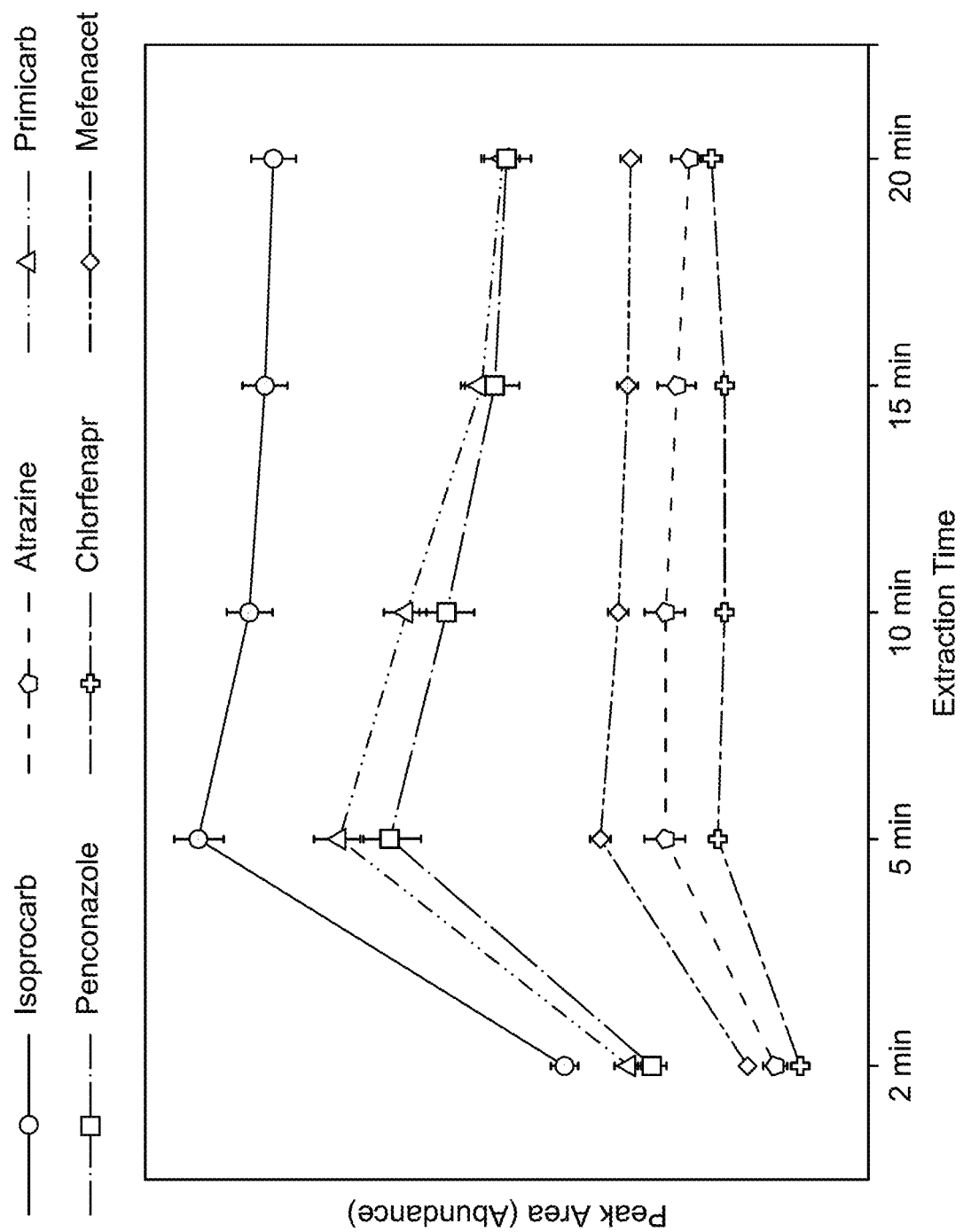
FIG. 6 depicts a plot showing effect of extraction time on the extraction efficiency of pesticides, according to certain embodiments.

Membrane-supported micro-solid-phase extraction operates on a non-exhaustive equilibrium principle, where analyte extraction efficiency typically improves with longer extraction durations. However, once equilibrium is reached, extending the extraction time yields negligible additional benefits. In the disclosure, extraction times ranging from 2 minutes to 20 minutes were explored. Optimal peak areas for the target analytes were observed at the 5-minute mark. Beyond this point, increasing the extraction time did not significantly affect the peak areas of the target compounds. Consequently, 5 minutes was determined to be the optimized extraction time for the disclosure, as shown in FIG. 6.

Example 16: Desorption

Figure 7:
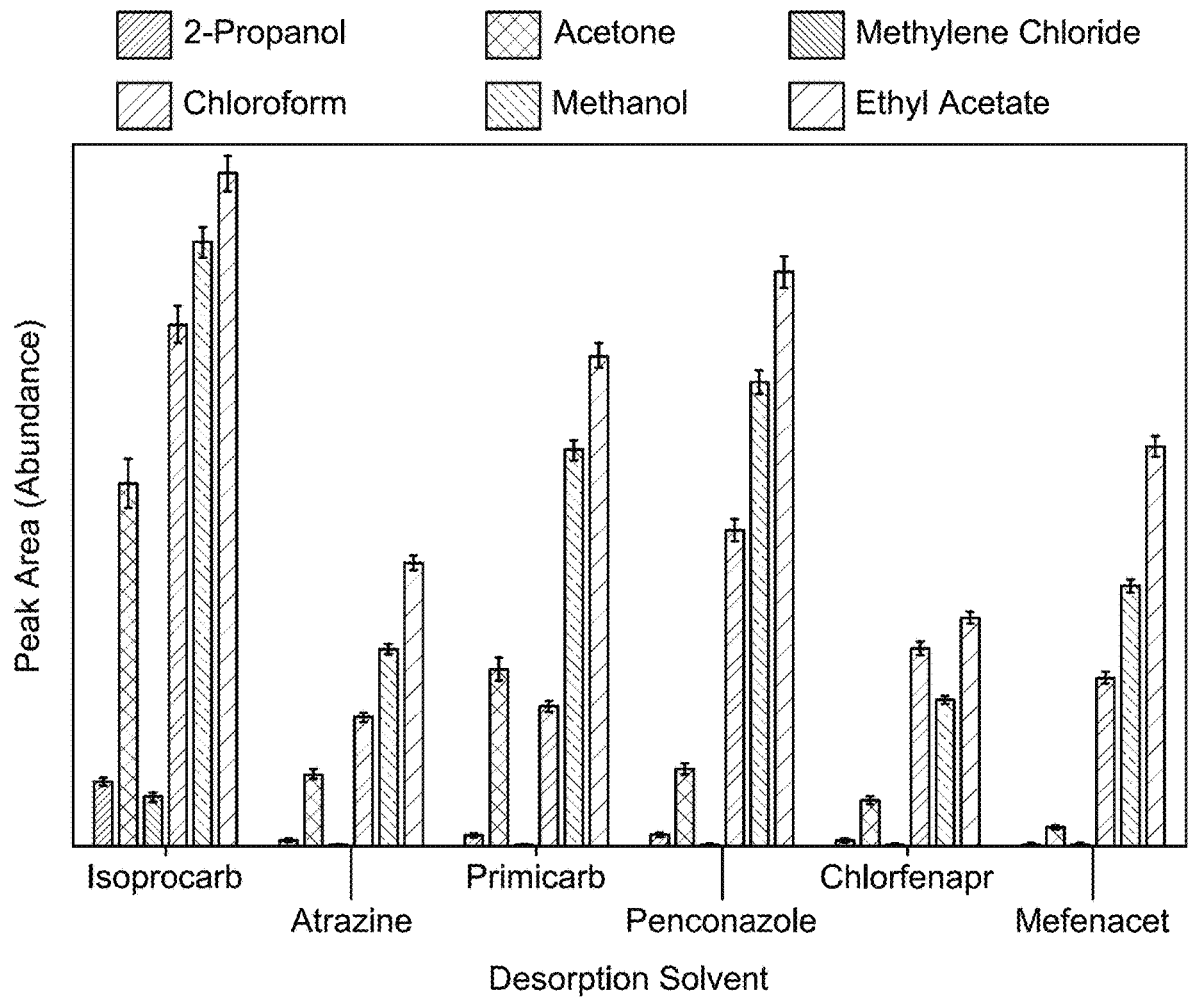
FIG. 7 depicts a plot showing efficacy of various organic solvents in desorbing pesticides from the sorbent, according to certain embodiments.

The efficacy of various organic solvents in desorbing pesticides from the sorbent were also investigated. These solvents covered a range of polarities, ranging from chloroform, the least polar solvent, to methanol, the most polar one. As shown in FIG. 7, ethyl acetate, situated as moderately polar but leaning toward the polar side, exhibited the best performance. This is attributed to the moderately polar nature of the pesticides.

Figure 8:
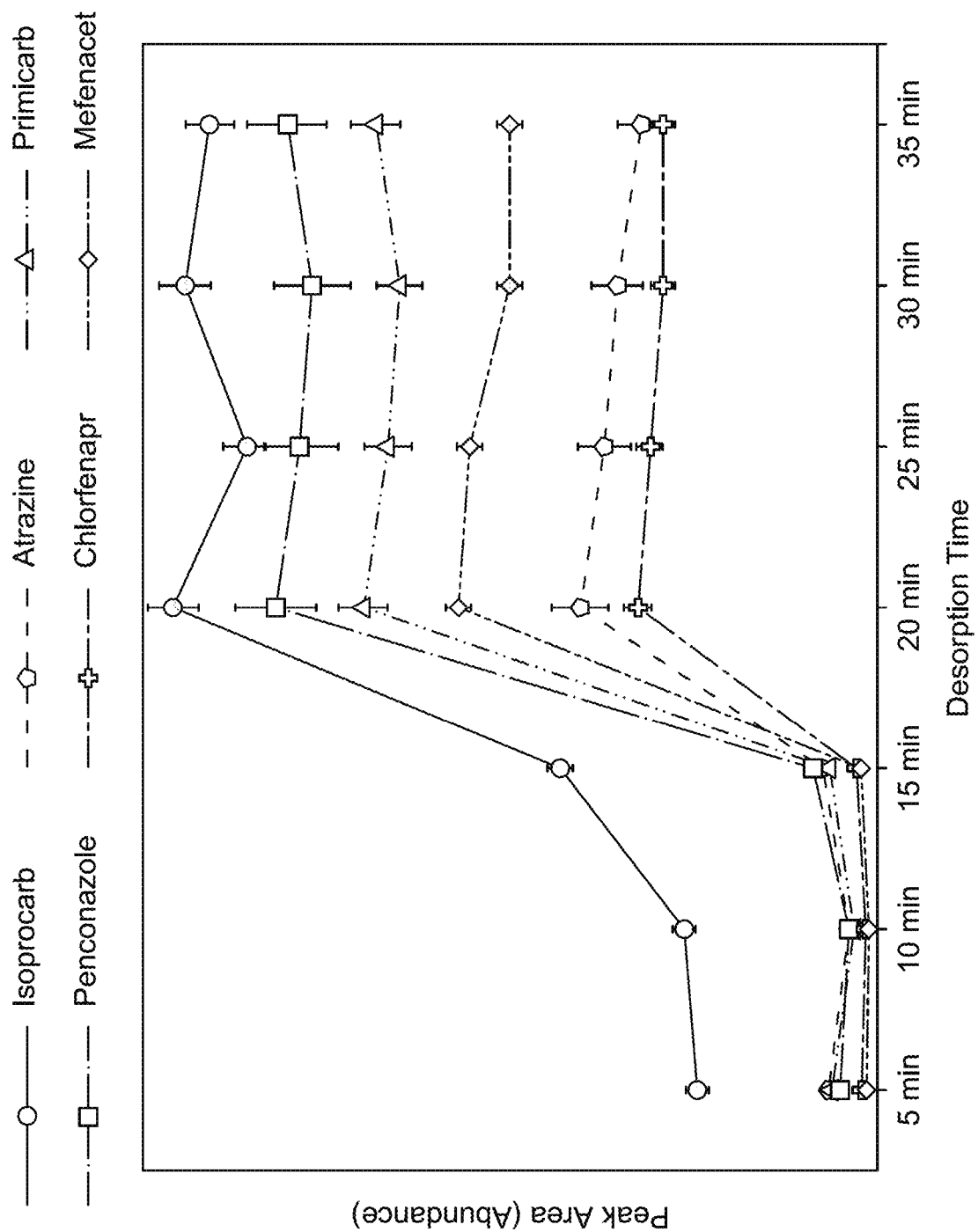
FIG. 8 depicts a plot showing effect of desorption time on the extraction efficiency of pesticides, according to certain embodiments.

As shown in FIG. 8, the desorption process took 20 minutes due to the strong absorption interactions between the sorbent and the pesticides.

Figure 9:
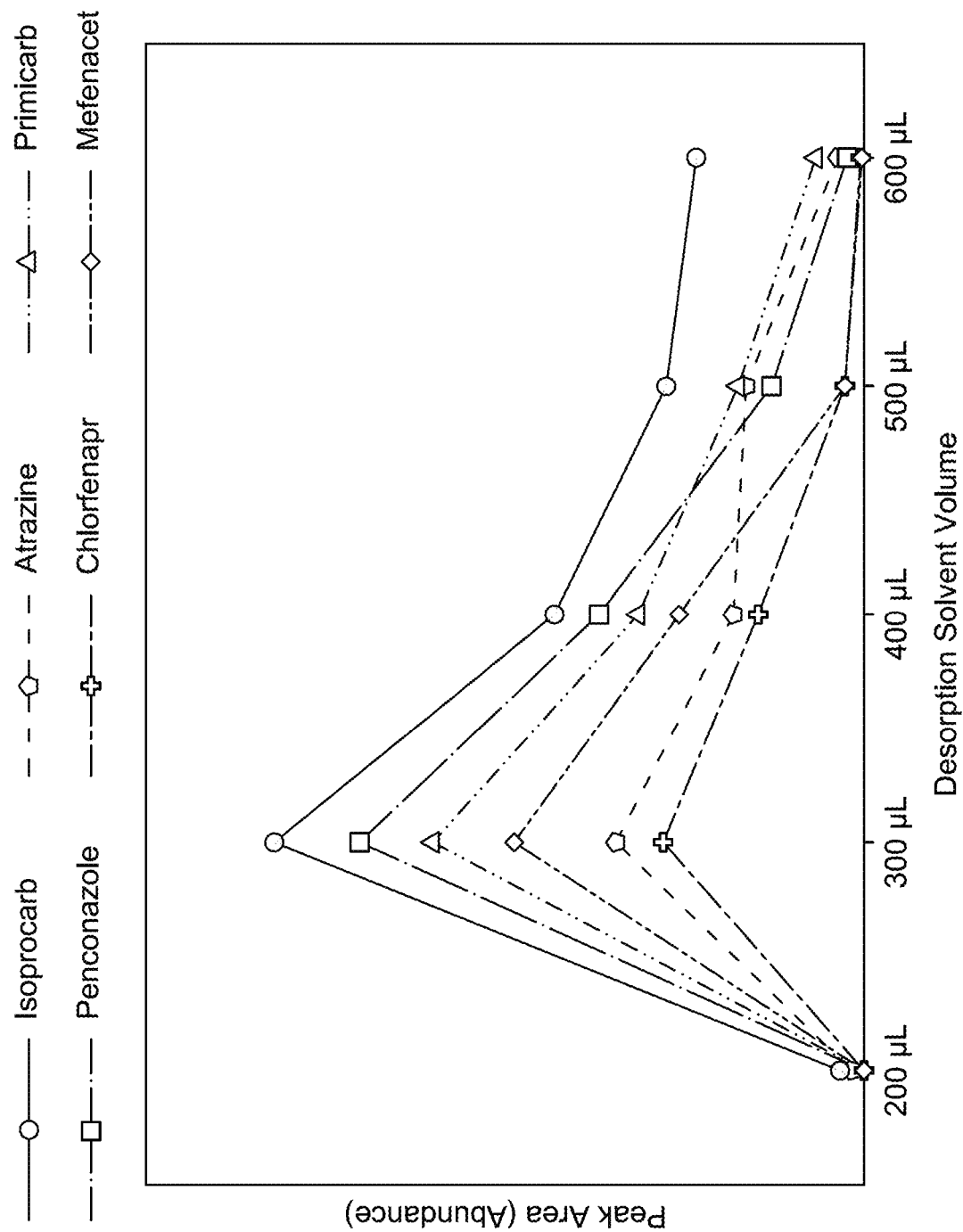
FIG. 9 depicts a plot showing effect of desorption solvent quantity on the extraction efficiency of pesticides, according to certain embodiments.
Figure 10:
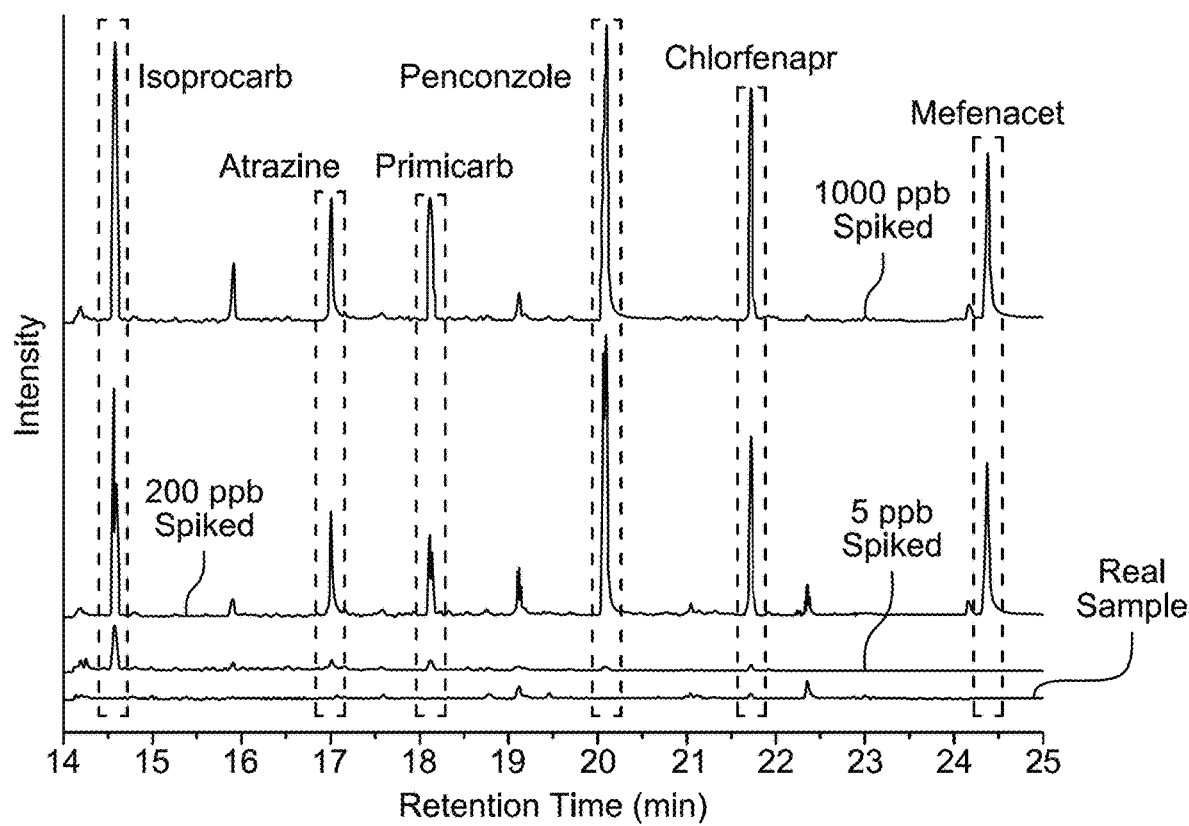
FIG. 10 depicts a plot of gas chromatography-mass spectrometry (GC-MS) overlaid chromatograms showing the real sample unspiked and spiked with pesticides mixture, according to certain embodiments.

The bag exhibited effective immersion in 300 µL of the desorption solvent, ensuring complete desorption of all pesticides. In contrast, when immersed in 200 µL, not all pesticides successfully desorbed into the solvent because the bag was not completely immersed. Furthermore, increasing the volume of the desorption solvent beyond 300 µL was observed to dilute the concentration, resulting in a reduction in the efficiency of the extraction. Consequently, the optimal desorption solvent quantity was determined to be 300 µL, as shown in FIG. 9.

Example 17: Method Validation and Real Sample Analysis

The linearity of the method, in the range of 5 parts per billion (pp)-1000 ppb was confirmed, with calculated R squared values ranging from (0.9859-0.9993). The limits of detection (LOD) and quantification (LOQ) were determined using the signal-to-noise method. LOD in the range of 0.36 ppb-1.52 ppb, and LOQ in the range of 1.30 ppb-5.00 ppb. Precision testing involved standards prepared in deionized water at three concentrations: one at the lowest limit of linearity, another at the highest level, and one in between, covering the entire linear range, as shown in table 4,

TABLE 4

Analytical features for the SB-µ-SBE of pesticides using spent catalyst sorbent.

| Analyte | R | Linear Equations | LOD (ng mL$^{-1}$) | LOQ (ng mL$^{-1}$) | RSDs (%) in DI water (n = 3) | | |
|---|---|---|---|---|---|---|---|
| | | | | | 5 ng mL$^{-1}$ | 200 ng mL$^{-1}$ | 1000 ng mL$^{-1}$ |
| Isoprocarb | 0.9977 | y = 2736.7x + 14723 | 0.36 | 1.19 | 5.2 | 7.6 | 5.3 |
| Atrazine | 0.9859 | y = 1161x + 28592 | 0.61 | 2.02 | 4.7 | 4.9 | 5 |
| Primicarb | 0.9941 | y = 2226.1x − 4060.9 | 0.39 | 1.3 | 5.8 | 5.3 | 5.7 |
| Penconazole | 0.9931 | y = 3274.4x − 83282 | 0.38 | 1.24 | 4.3 | 4.3 | 2.7 |
| Chlorfenapr | 0.9993 | y = 1111.5x − 17846 | 1.52 | 5 | 5.9 | 2.7 | 8 |
| Mefenacet | 0.9982 | y = 1921.8x − 26366 | 0.61 | 2 | 6.6 | 5.5 | 5.5 |

Linear Range: 5-1000 ng mL$^{-1}$

Table 4 shows that among six distinct pesticides that were analyzed in the disclosure, four were detected in the actual sample, exhibiting precision with relative standard deviation (RSD %) ranging from 5.6% to 15.1%. Subsequently, the real sample underwent spiking to ascertain the relative recovery, yielding a percentage range of 84.9% to 99.5% [S. M. S. Jillani, A. Tanimu, A. Ibrahim, K. Alhooshani, S. A. Ganiyu, Development of Nickel-Impregnated Nitrogen-Doped Activated Carbon for Micro-solid-phase Extraction of Chlorinated Hydrocarbons from Wastewater, Arab J Sci Eng 48 (2023) 7603-7612, incorporated herein by reference in its entirety]. The chromatogram for real sample analysis is presented in FIG. 9.

$$\text{Relative recovery} = \frac{a}{b} \times 100 \quad (3)$$

a=Peak area of the analyte extracted from wastewater samples,
b=peak area of the analyte extracted from deionized water.

TABLE 5

Real Sample analysis

| Analyte | Pesticides residues detected in Wastewater sample. (ppb) | RSDs (%) for Wastewater Analysis (n = 3) | Relative recovery of spiked pesticide residue from wastewater | | | RSDs (%) of spiked pesticide residue from wastewater (n = 3) | | |
|---|---|---|---|---|---|---|---|---|
| | | | 5 ng mL$^{-1}$ | 200 ng mL$^{-1}$ | 1000 ng mL$^{-1}$ | 5 ng mL$^{-1}$ | 200 ng mL$^{-1}$ | 1000 ng mL$^{-1}$ |
| Isoprocarb | N.D. | — | 85.9 | 92.3 | 94.8 | 11.5 | 10.5 | 8.16 |
| Atrazine | N.D. | — | 89.6 | 90.8 | 92.9 | 11.4 | 4.08 | 14.2 |
| Primicarb | 4.09 | 15.1 | 85.7 | 96.7 | 93.1 | 11.5 | 3.21 | 9.16 |
| Penconazole | 26.4 | 5.6 | 84.9 | 87.1 | 88.9 | 9.19 | 12.4 | 17.9 |
| Chlorfenapr | 21.8 | 12.6 | 85 | 93.7 | 93.2 | 8.23 | 11 | 4.38 |
| Mefenacet | 13.9 | 7.1 | 85.7 | 94.6 | 99.5 | 10.4 | 8.81 | 11.7 |

N.D.: Not Detected

In the present disclosure, the use of spent FCC catalysts as sorbents in the membrane-supported micro-solid-phase extraction process (MSPE) has been demonstrated as a highly successful material for extracting pesticides from wastewater. The pretreated spent FCC catalysts were characterized using PXRD, BET, SEM, and FTIR. Among the catalysts, the spent FCC catalyst pretreated by washing with a water-methanol solution gives the best extraction performance due to its increased surface area, improved porosity, and enhanced active sites for adsorption. All parameters related to the microextraction process were optimized using a univariate approach. The established procedure demonstrated the detection of four pesticides in the actual treated wastewater sample, including primicarb, penconazole, chlorfenapyr, and mefenacet. Additionally, the methodology has shown high relative recovery rates from 84.9% to 99.5%. The method has achieved significant results, including a wide linear detection range from 5 nanogram per milliliter (ng/mL) to 1000 ng/mL and low limits of detection (LOD) between 0.36 ng/mL and 1.52 ng/mL. The findings highlight the effectiveness and sensitivity of using spent FCC catalysts in MSPE extraction for pesticide analysis, providing a robust approach to safeguarding water quality. Moreover, the versatility of spent FCC catalysts suggests the potential for extracting other pollutant classes, emphasizing the broader applicability and environmental importance of the approach. Further, a method of repurposing the spent FCC catalysts as sorbents in the MSPE process is described, offering a sustainable approach to disposal while demonstrating economic and environmental benefits from reusing industrial by-products.

Numerous modifications and variations of the present disclosure are possible in light of the above teachings. It is therefore to be understood that within the scope of the appended claims, the invention may be practiced otherwise than as specifically described herein.

The invention claimed is:

1. A method of removing organic pollutants from water comprising the steps of:
    providing a filtration membrane;
        the filtration membrane comprising:
        a porous polymer support;
        sorbent particles of a spent fluid catalytic cracking catalyst that include a porous aluminosilicate material formed as a layer on the porous polymer support defining an upstream surface and a downstream permeate surface, wherein the sorbent particles comprise 8.0 to 50.0 atom % carbon, based on a total number of atoms of sorbent particles;
        a carbonaceous material disposed on the upstream surface of the porous aluminosilicate material; and
        a silica coating disposed on the upstream surface of the porous aluminosilicate material and a surface of the carbonaceous material;
    flowing water contaminated with at least one organic pollutant that is selected from the group consisting of: a dye, a phenol, a polycyclic aromatic hydrocarbon, a herbicide, a pesticide, a persistent organic pollutant, and combinations thereof, through pores of the filtration membrane, producing a permeate with a reduced organic pollutant concentration and a contaminated membrane.

2. The method of removing organic pollutants from water of claim 1, wherein the porous aluminosilicate material is a USY zeolite.

3. The method of removing organic pollutants from water of claim 1, wherein the sorbent particles comprise 18.0 to 30.0 atom % carbon, based on a total number of atoms of sorbent particles.

4. The method of removing organic pollutants from water of claim 1, wherein the sorbent particles have a silicon to aluminum atomic ratio of 2.70 to 4.50.

5. The method of removing organic pollutants from water of claim 1, wherein the sorbent particles have:
a BET surface area of 115 to 150 m$^2$/g;
a pore volume of 0.1500 to 0.1850 cm$^3$/g, and
a mean pore size of 4.75 to 6.00 nm.

6. The method of removing organic pollutants from water of claim 1, wherein the sorbent particles have a mean particle size of 25 to 400 μm.

7. The method of removing organic pollutants from water of claim 1, wherein the porous polymer support is a polypropylene support.

8. The method of removing organic pollutants from water of claim 1, wherein the porous polymer support has a mean pore size of 0.10 to 0.50 μm.

9. The method of removing organic pollutants from water of claim 1, wherein the carbonaceous material is a fluid catalytic cracking coke.

10. The method of removing organic pollutants from water of claim 1, further comprising recovering the organic pollutant by contacting the contaminated membrane with an elution solvent to form a contaminated solvent comprising the organic pollutant; and collecting the contaminated solvent.

11. The method of removing organic pollutants from water of claim 10, wherein the elution solvent is at least one elution solvent selected from the group consisting of 2-propanol, acetone, methylene chloride, chloroform, methanol, ethyl acetate, and combinations thereof.

12. The method of removing organic pollutants from water of claim 1, wherein the organic pollutant is at least one organic pollutant selected from the group consisting of isoprocarb, atrazine, primicarb, penconazole, chlorfenapr, mefenacet, and combinations thereof.

13. The method of removing organic pollutants from water of claim 1, further comprising:
forming the filtration membrane by washing a spent fluid catalytic cracking catalyst with an alcohol having 1 to 5 carbon atoms to form an untreated aluminosilicate material; and
disposing the untreated aluminosilicate material on the porous polymer support.

14. The method of removing organic pollutants from water of claim 1, further comprising:
forming the filtration membrane by washing a spent fluid catalytic cracking catalyst with an alcohol having 1 to 5 carbon atoms to form an untreated aluminosilicate material;
calcining the untreated aluminosilicate material at 500 to 750° C. for 1 to 12 hours to form a treated aluminosilicate material; and
disposing the treated aluminosilicate material on the porous polymer support.

15. The method of removing organic pollutants from water of claim 1, further comprising:
forming the filtration membrane by washing a spent fluid catalytic cracking catalyst with an alcohol having 1 to 5 carbon atoms to form an untreated aluminosilicate material;
solvothermally treating a coating mixture comprising the untreated aluminosilicate material and an organosilane at 75 to 125° C. for 8 to 48 hours to form an intermediate; and
calcining the intermediate at 500 to 750° C. for 1 to 12 hours to form a coated aluminosilicate material; and
disposing the coated aluminosilicate material on the porous polymer support.

16. The method of removing organic pollutants from water of claim 15, wherein the organosilane is tetraethoxysilane.

17. The method of removing organic pollutants from water of claim 15, wherein the coating mixture has a weight ratio of the untreated aluminosilicate material to the organosilane of 2:1 to 1:2.

* * * * *